(12) United States Patent
Sakai et al.

(10) Patent No.: US 8,160,295 B2
(45) Date of Patent: Apr. 17, 2012

(54) IMAGE-PROCESSING DEVICE AND IMAGE-PROCESSING METHOD FOR EMBEDDING CODE PATTERNS IN IMAGE INFORMATION

(75) Inventors: Hiroyuki Sakai, Chigasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1108 days.

(21) Appl. No.: 12/026,380

(22) Filed: Feb. 5, 2008

(65) Prior Publication Data

US 2008/0205697 A1 Aug. 28, 2008

(30) Foreign Application Priority Data

Feb. 28, 2007 (JP) ................................. 2007-050197

(51) Int. Cl.
*G06K 9/00* (2006.01)
(52) U.S. Cl. ........ 382/100; 382/276; 348/469; 348/473; 358/1.1; 358/1.9; 358/3.06; 358/3.28
(58) Field of Classification Search .................... None
See application file for complete search history.

(56) References Cited

U.S. PATENT DOCUMENTS

| | | | |
|---|---|---|---|
| 5,652,626 A | 7/1997 | Kawakami et al. | |
| 5,946,414 A * | 8/1999 | Cass et al. | 382/183 |
| 6,527,047 B1 | 3/2003 | Pietras | |
| 7,058,232 B1 | 6/2006 | Miyake | |
| 7,187,476 B2 | 3/2007 | Umeda et al. | |
| 2004/0042670 A1* | 3/2004 | Moroo et al. | 382/232 |
| 2004/0234139 A1* | 11/2004 | Moroo et al. | 382/232 |
| 2005/0276439 A1* | 12/2005 | Ishii | 382/100 |
| 2007/0230826 A1* | 10/2007 | Moroo et al. | 382/295 |

FOREIGN PATENT DOCUMENTS

| | | |
|---|---|---|
| JP | 2001-148778 A | 5/2001 |
| JP | 2004-147253 A | 5/2004 |
| JP | 2005-182164 A | 7/2005 |
| JP | 2006-253839 A | 9/2006 |

* cited by examiner

*Primary Examiner* — Sath V Perungavoor
*Assistant Examiner* — Jason Heidemann
(74) *Attorney, Agent, or Firm* — Canon U.S.A., Inc. IP Division

(57) ABSTRACT

For facilitating detecting the position of additional information embedded in image information shown on a printed matter, an input unit configured to input image information and an embedding unit configured to embed a plurality of code patterns in the image information according to additional information are provided. The additional information includes direction-determination information used to detect the direction in which the additional information is embedded in the image information. When one of the code patterns is rotated, the rotated code pattern corresponds to one of the code patterns that are not yet rotated.

9 Claims, 23 Drawing Sheets

IMAGE-PROCESSING DEVICE AND IMAGE-PROCESSING METHOD FOR EMBEDDING CODE PATTERNS IN IMAGE INFORMATION

BACKGROUND OF THE INVENTION

1. Field of the Invention

The present invention relates to an image-processing device and an image-processing method.

2. Description of the Related Art

Various techniques for embedding special information in image data have been proposed, for example, to prevent the image data from being copied in an unauthorized manner and/or falsified. There is a technology referred to as the digital-watermark technology, which is used to embed additional information in electronic data corresponding to an image including a photograph, a painting, etc., where the additional information includes, for example, information about the name credit and/or use permission of the electronic-image data. In recent years, the technology of distributing image data where the additional information is embedded so that the additional information is visually unobtrusive via a network such as the Internet has become more standardized.

Further, the technology of determining the type and/or number of a printing device which printed an image on the basis of a printed matter such as an image printed on a piece of paper has also been studied. The determination technology is used to prevent a bill, a stamp, a negotiable instrument, etc. from being forged, as the quality of an image attained by an image-forming device including a copier, a printer, etc. is improved.

According to the above-described technology, for example, the additional information is often embedded in part of image data, where the part corresponds to a color-difference component with low visual sensitivity and the high-frequency part of a saturation component. However, it is difficult to embed large-capacity information such as sound information in image data during printing by using the above-described technology so that the large-capacity information is unobtrusive.

Further, the method of artificially generating the combination of quantization values that do not occur through ordinary pseudo-halftoning by using a texture occurring through an error-diffusion method, and embedding code data generated on the basis of the quantization values is known, as another example of the above-described technology. According to the above-described embedding method, the visual quality of image data where the code data is embedded hardly differs from that of original image data, even though the geometry of the texture of the image data where the code data is embedded is microscopically changed. Further, according to the above-described embedding method, different signals can be easily multiplexed on one another by changing the quantization-threshold value while executing the error-diffusion method.

Here, an image-processing system configured to embed the additional information in arbitrary image data, print the image data so that a printed matter is generated, and retrieve the embedded additional information from the printed matter will be described. FIG. 1 is a block diagram showing the configuration of an image-processing device configured to embed the additional information in arbitrary image data and print the image data.

According to the image-processing device, arbitrary multi-level gray scale image information is input via an input terminal 191, and additional information which will be embedded in the image information is input via an input terminal 192. The additional information includes various types of information about a copyright, photographing date and time, a photographing location, a photographer, etc. relating to the image information input from the input terminal 191 and/or sound information, text information, etc. that are not relating to the image information.

An additional-information-multiplexing unit 193 embeds the input additional information in the input image information so that the additional information is visually unobtrusive. Namely, the additional-information-multiplexing unit 193 divides the input image information into N×N-pixel blocks, and embeds the additional information in each of the blocks.

A printer 194 prints the image information where the additional information is embedded onto a print medium, and outputs a printed image 195. The printer 194 is configured, as an ink-jet printer, a laser-beam printer, etc., which can represent gray scale through pseudo-halftoning.

FIG. 2 is a block diagram showing the configuration of an image-processing device configured to retrieve the additional information embedded in the image information shown in the printed image 195, which is the output of the image-processing device shown in FIG. 1.

The image-processing device acquires the image data corresponding to the image information printed on the print medium through an image scanner 201. Upon receiving the image data, an additional-information-separation unit 202 detects an image area where the additional information is embedded by performing known image processing. According to a representative detection method, the boundary between a non-image area and an image area is detected based on the color-density difference. After detecting the image area, the additional-information-separation unit 202 separates the additional information embedded in the detected image area, and outputs the separated additional information to an output terminal 203.

However, the above-described image-processing system has the following problems.

First, according to the image information input from the input terminal 191, it is often difficult to detect the boundary between the non-image area and the image area according to the method of detecting the image area on the basis of the color-density difference shown in the image data. Since the additional information is unobtrusively embedded in the image data where the above-described boundary is shown with poor clarity, the image area should be defined with precision. For example, when reading the printed image 195 through the image scanner 201, the image area should be subjected to trimming before setting. However, it is often difficult for the user to determine which area of the image area should be trimmed, so as to set the image area.

Further, the input image is divided into two or more N×N-pixel blocks, and information obtained by dividing the additional information is multiplexed on each of the blocks. Therefore, the additional-information-separation unit 202 should grasp the area of each of the blocks with an error of about few pixels at the maximum. When the error is increased, the precision with which the additional information is detected is significantly decreased, which makes it difficult to correctly extract the additional information.

In the past, the method of arranging reference marks around the image area where the additional information is embedded at predetermined intervals and printing the image data has been used, so as to solve the above-described problems. According to the above-described method, it becomes possible to read the printed image by using an image scanner, detect the reference marks from the read image information, correct distortion according to the reference marks, and detect the block area with high precision.

FIG. 3 shows the overview of a printed matter obtained through the above-described method. Image information 231 is shown inside an area indicated by oblique lines, the area being shown on a print medium 232. Then, reference marks 233 are shown so that the image information 232 is surrounded by the reference marks 233. By forming the reference marks 233 on the print medium 232, it becomes possible to detect the reference marks 233 and detect an N×N-pixel block 234 with high precision.

In recent years, the functions of image-forming devices including a copier, a printer, etc. have been improved. Therefore, the function of performing borderless printing for an image picked up by an image-pickup device such as a digital camera has been provided, and the number of users performing the borderless printing has increased. There are many printers configured to make the size of image data for printing larger than that of a print medium and print the image data so that the border of the image data is cut off, whereby the borderless printing is achieved.

If a device implementing the borderless printing by cutting the border of an image attempts to print the reference marks around the image area, so as to detect the image area where the additional information is embedded, the reference marks may be cut off.

FIG. 4 shows an example where the borderless printing is performed for the printed matter obtained through the above-described method. In that case, the reference marks 233 arranged at the predetermined intervals around the image information 231 are positioned outside the print medium 232 so that the reference marks 233 are not formed. Since the reference marks 233 are not shown, it is difficult to detect the N×N-pixel block 234 with high precision. That is to say, the method of arranging the reference marks 233 around the image area is not appropriate for performing the borderless printing.

Of course, if the size of the print medium 232 is made to agree with that of image data for printing and the image data is printed so that the position of the print medium 232 does not deviate from the position of the image data, it becomes possible to print the image data including the reference marks 233 on the print medium 232. However, the mechanism of the printer makes it difficult to print the image data so that the position of the print medium 232 does not deviate from the position of the image data.

Further, the technology of embedding the additional information in an area of the same size as that of a printed-image area, detecting the edge line of the printed-image area, and detecting the additional information embedded in the area of the same size as that of the printed-image area has been available.

FIG. 5 shows the overview of a printed matter obtained through the above-described technology. A printed-image area is defined on the print medium 232 and the image information 231 is formed. The N×N-pixel block 234 is set according to the size of the image information 231. Therefore, if the edge of the image information 231 (the edge line of the printed-image area) can be detected, the N×N-pixel block 234 can be detected with high precision.

FIG. 6 shows an example where the borderless printing is performed for the printed matter obtained through the above-described technology. When the borderless printing is performed, the border of the image data is cut off. Therefore, even though the edge of the image information is detected from the printed image, the detected edge is different from that of the image information 231 which is not yet printed, which makes it difficult to detect the N×N-pixel block 234 with high precision.

Further, when data shown on the printed image is read, it is desirable for the user that the data is read even though the user is not aware of the orientation of the print image and the N×N-pixel block 234 is detected with high precision.

In another case, embedded information can be extracted irrespective of the block position and the orientation of a print medium by using a two-dimensional code such as QR Code (Registered Trademark). In the case where the two-dimensional code is used, however, the embedded information includes marker data visible to a person, which may affect the design of a photograph and/or a painting.

SUMMARY OF THE INVENTION

An embodiment of the present invention is directed to a method for facilitating detecting the position of additional information embedded in image information shown on a printed matter.

An embodiment of the present invention is directed to a method for facilitating detecting the position of the additional information embedded in the image information shown on the printed matter without being affected by the orientation of the printed matter.

Accordingly, an apparatus (e.g., image-processing device) according to an embodiment of the present invention includes an input unit configured to input image information, and an embedding unit configured to embed a plurality of code patterns in the image information according to additional information, wherein the additional information includes direction-determination information used to detect a direction in which the additional information is embedded in the image information. When one of the code patterns is rotated, the rotated code pattern corresponds to one of the code patterns that are not yet rotated.

Further features of the present invention will become apparent from the following description of exemplary embodiments with reference to the attached drawings.

BRIEF DESCRIPTION OF THE DRAWINGS

FIG. 19 shows the result of the additional-information separation performed when the orientation of the area of image data read by the image scanner agrees with the orientation of the area of the additional information.

FIG. 20 shows the result of the additional-information separation performed when the orientation of the area of image data read by the image scanner is vertically reversed with reference to the orientation of the area of the additional information.

DESCRIPTION OF THE EMBODIMENTS

Hereinafter, image processing performed according to embodiments of the present invention will be described in detail with reference to the attached drawings.

First Embodiment

[Configuration of Hardware]

Figure 7:
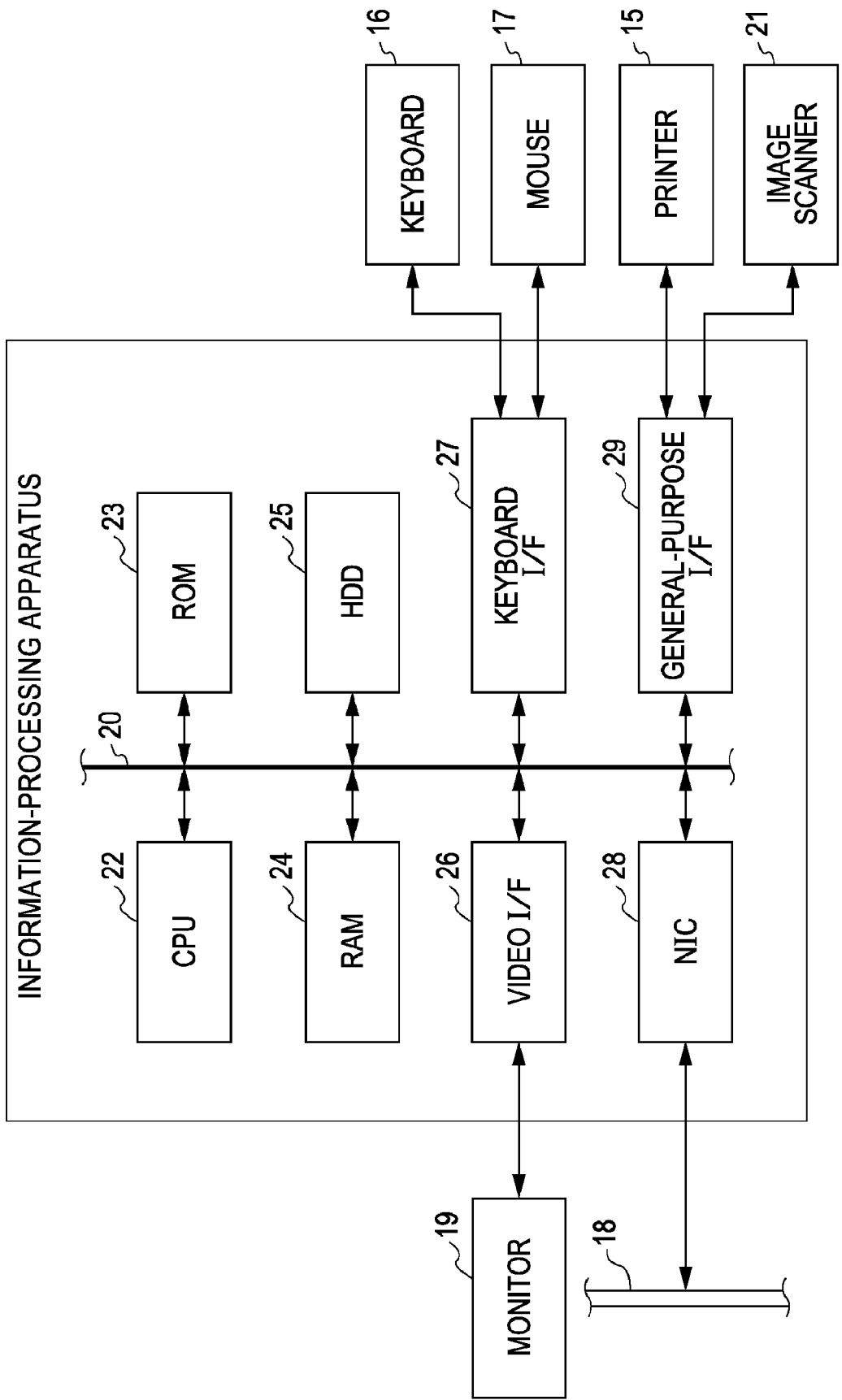
FIG. 7 is a block diagram showing an example configuration of an information-processing device such as a computer device implementing the functions of processing units of another image-processing device.

FIG. 7 is a block diagram illustrating an example configuration of an information-processing device such as a computer device implementing the function of each of processing units of an image-processing device that will be described later.

A central-processing unit (CPU) 22 executes a program stored in a read-only memory (ROM) 23 and/or a hard-disk drive (HDD) 25 by using a random-access memory (RAM) 24, as a work area, controls each of compositions via a system bus 20, and executes image processing that will be described later. The CPU 22 shows information about the progression and/or result of the image processing, and the image of a user interface on a monitor 19 connected to a video interface (I/F) 26, and receives an instruction issued by a user via a keyboard 16 and/or a mouse 17 connected to a keyboard I/F 27.

Further, the CPU 22 performs image processing for image data stored in the HDD 25, image data acquired from a server provided on a network 18 to which the image-processing device is connected via a network-interface card (NIC) 28, and so forth. Then, the CPU 22 outputs the image data subjected to the image processing to a printer 15 connected to a general-purpose I/F 29 such as a universal-serial buss (USB) so that the image corresponding to the image data can be printed. Further, the CPU 22 controls and makes an image scanner 21 connected to the general-purpose I/F 29 read data on the image shown on a document placed on a reading mount and/or a document feeder so that the document-image data is stored in the RAM 24 and the HDD 25.

[Adding Device]

Figure 8:
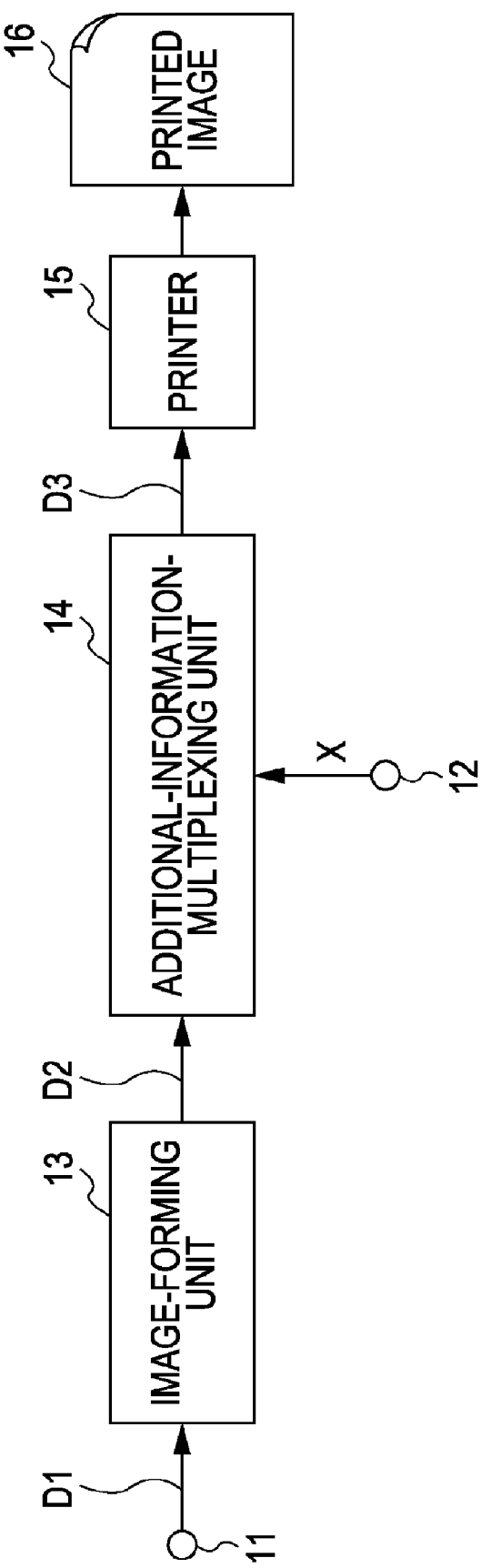
FIG. 8 is a block diagram showing an example functional configuration of an adding device.

Next, an image-processing device configured to embed additional information in image data (hereinafter referred to as an adding device) will be described. FIG. 8 is a block diagram showing an example functional configuration of the adding device.

An image-forming unit 13 has a resolution-change function capable of changing the resolution of multi-level gray scale image information D1 input from an input terminal 11 to a predetermined resolution. The additional-information-multiplexing unit 14 has a function of embedding additional information X transmitted from an input terminal 12 in image information D2 with changed resolution. The image information D3 with the additional information X embedded therein is printed on a print medium by the printer 15 so that a printed image 16 is generated. The input terminal 11 corresponds to the HDD 25, the NIC 28, or the general-purpose I/F 29, for example. Further, the input terminal 12 corresponds to the HDD 25, the NIC 28, the general-purpose I/F 29, or the keyboard I/F 27, for example.

Usually, the additional information X relates to image information D1. For example, the additional information X includes information relating to the copyright of the image information D1, data on the type of a image file, data on the size of an image, data on the image information D1 itself, data on the histogram of the image information D1, data on the details on image correction, and Exif information about the image. However, information which is not related to the image information D1, such as sound information and/or text information may be provided, as the additional information X. Further, the information which is not related to the image information D1 may be added to the additional information X.

For example, suppose that a Joint Photographic Experts Group (JPEG) image obtained by photographing performed through an image-pickup device is stored in the HDD 25, wherein the JPEG image includes the Exif information. The user can select the JPEG image stored in the HDD 25 by operating the keyboard 16 and/or the mouse 17. Then, the CPU 22 reads the selected JPEG image data from the HDD 25 and stores the JPEG image data in the work area of the RAM 24, and displays the JPEG image data and the Exif information that are stored in the RAM 24 on the monitor 9. The user can select printing settings and issues a print instruction for the image shown on the monitor 19 by operating the keyboard 16 and/or the mouse 17. The printing settings include information about the type and size of recording paper, the printing quality, a layout (indicating whether or not a border should be left), various types of correction, and so forth.

When a print instruction is issued, JPEG-image data is input to the input terminal 11, as the image information D1, and the Exif information is input to the input terminal 12, as the additional information X.

Further, the adding device may not be a computer device. Namely, the adding device may be a device and/or an apparatus that can transmit the image information D1 to the printer 15, where the device and/or the apparatus includes a scanner, an HDD recorder, a digital TV, a digital camera, a mobile phone, and so forth. Further, the adding device may be provided in the printer 15, as a part of the printer 15. When the adding device is included in the printer 15, the selection of the image information D1, the print instruction, etc. are made through an input interface including the touch panel and/or buttons of a printer-operation unit in place of the keyboard 16 and the mouse 17.

Further, it is noted that the image information D1 input from the input terminal 11 may not only be the JPEG-image data, but data on an image generated in a bitmap format, data on an image generated in Portable-Network-Graphics (PNG) format, data on a still image obtained by capturing video data, and so forth. Likewise, the additional information X input from the input terminal 12 may not be the Exif information. That is to say, it is essential only that the additional information X be electronic data including, for example, sound information generated in WAV format, date information indicating the date and time where image is photographed, Global Positioning System (GPS) information indicating the photographing position, video data compressed in Moving Picture Experts Group (MPEG) format, still-image data, print-setting information, data on the histogram of the image information D1, identification information, and so forth.

Image-forming Unit 13

The image-forming unit 13 performs resolution-change processing, so as to print image data on a print medium. More specifically, the image-forming unit 13 adjusts the image information D1 to the print size according to the recording-paper size, layout information, etc. through the resolution-change processing. For performing the resolution-change processing, any method including known nearest-neighbor interpolation, linear interpolation, etc. may be used.

For example, in the case where JPEG-image data is input as the image information D1, and the image information D1 is printed on a piece of recording paper of the L size (89×127 mm) by securing a border, an image area smaller than the size of recording paper of the L size is defined and linear-interpolation processing is performed for the JPEG-image data according to the image area, whereby the resolution is changed. Further, in the case where the image information D1 of the JPEG-image data is printed on the piece of recording paper of the L size (89×127 mm) through borderless printing, an image area larger than the recording paper of the L size is defined and the linear-interpolation processing is performed for the JPEG-image data according to the image area, whereby the resolution is changed. Further, information about the specification of the recording paper and an instruction about border printing or borderless printing is input by the user via the keyboard 16 and/or the mouse 17.

Additional-information-multiplexing Unit 14

The additional-information-multiplexing unit 14 embeds the additional information X in image information D2 so that the additional information X embedded in a printed image 16 is unobtrusive to people. That is to say, a predetermined area of the image information D2 is divided into a plurality of N×N-pixel blocks so that the additional information X can be extracted by analyzing the frequency component of the texture of the block, and a quantization-threshold value obtained by the error-diffusion method of each of the blocks is changed according to a predetermined amount of the additional information X. By performing the above-described processing, it becomes possible to generate a texture for each of the blocks, where the texture is generated with difficulty according to an ordinary error-diffusion method. Therefore, the additional information X can be embedded in the image information D2 so that the additional information X is unobtrusive to people.

Figure 9:
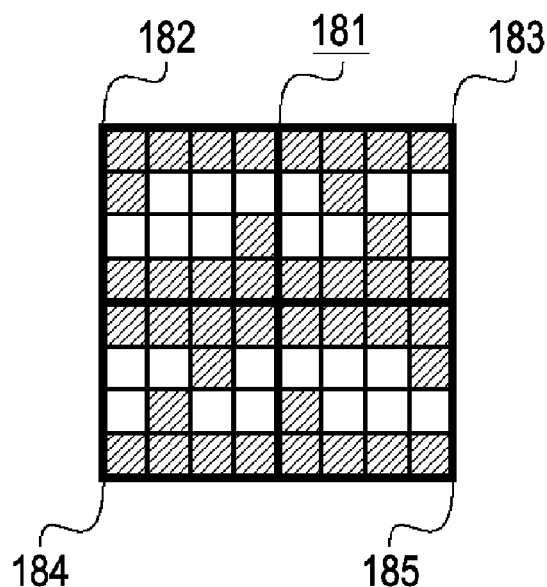
FIG. 9 illustrates an example of a code pattern of a block.

Further, the code pattern of each of the blocks is a single code including a combination of the patterns of sub-blocks. FIG. 9 illustrates an example of a code pattern of a block 181, which comprises a set of four sub-blocks 182, 183, 184, and 185. The patterns of the sub-blocks 182 to 185 are different from one another and a single code is generated when the four sub-blocks are combined with one another. Thus, FIG. 9 shows an example where four sets of 4×4-pixel sub-blocks are provided, as a single code pattern. However, according to another embodiment of the present invention, the number of pixels used in the sub-block and/or the number of sets of the sub-blocks may be changed, so long as the combination of the patterns of the sub-blocks indicates a single code.

Figure 10:
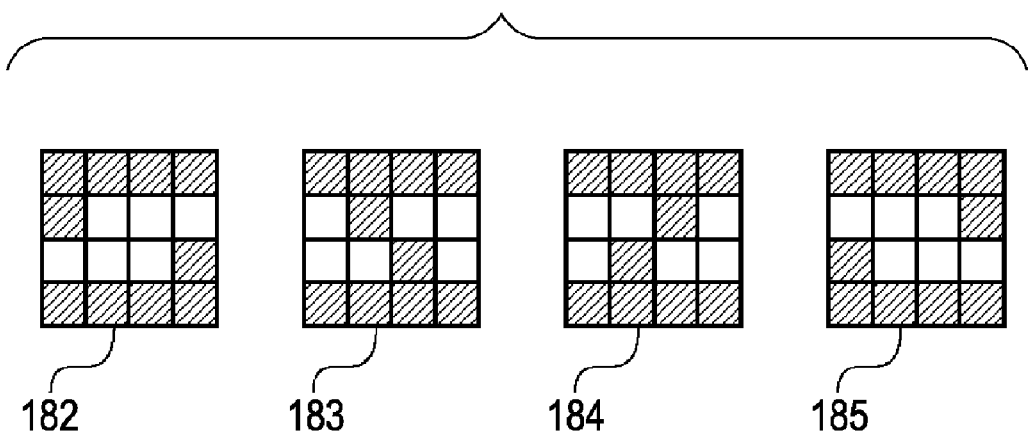
FIG. 10 shows the pattern of each of sub-blocks of the code pattern illustrated in FIG. 9.

Further, if the pattern of each of the sub-blocks is rotated, the rotated pattern is identified as the same pattern as a pattern which is not yet rotated. FIG. 10 shows the patterns of the sub-blocks of the code pattern block 181 illustrated in FIG. 9. Each of the sub-blocks 182 to 185 has a pattern which is rotationally symmetrical. Therefore, even though the pattern is vertically reversed, the same pattern as the pattern which is not yet rotated can be obtained. By combining the above-described sub-blocks, a plurality of code patterns is set. Further, the patterns of the sub-blocks 182 to 185 are not limited to those shown in FIG. 10. Namely, in an embodiment, it is essential only that the sub-blocks 182 to 185 have patterns that are identified as the same patterns as those which are not yet rotated even though the patterns are vertically reversed and the patterns are different from one another.

Figure 11:
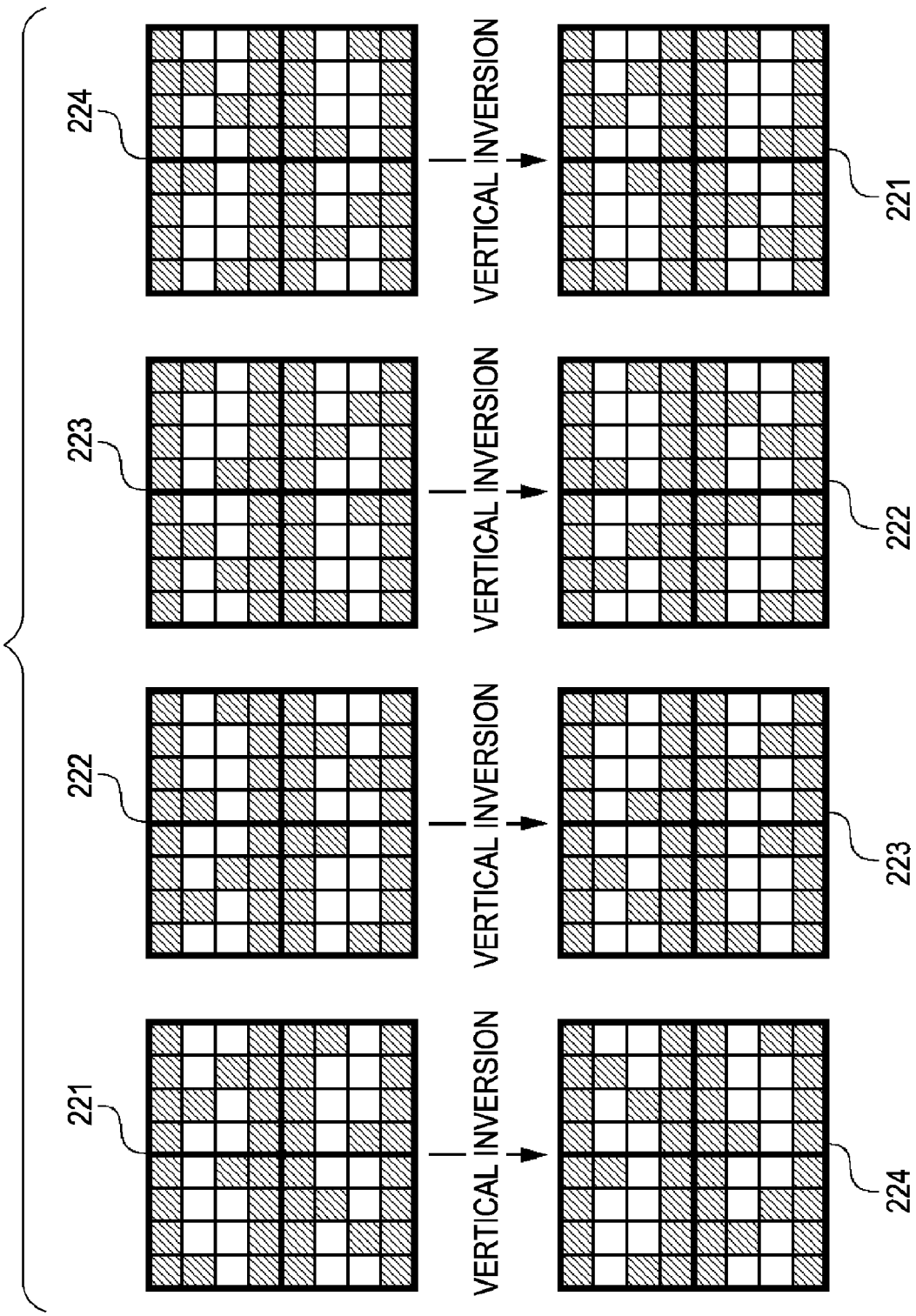
FIG. 11 shows the code patterns of blocks.
Figure 12:
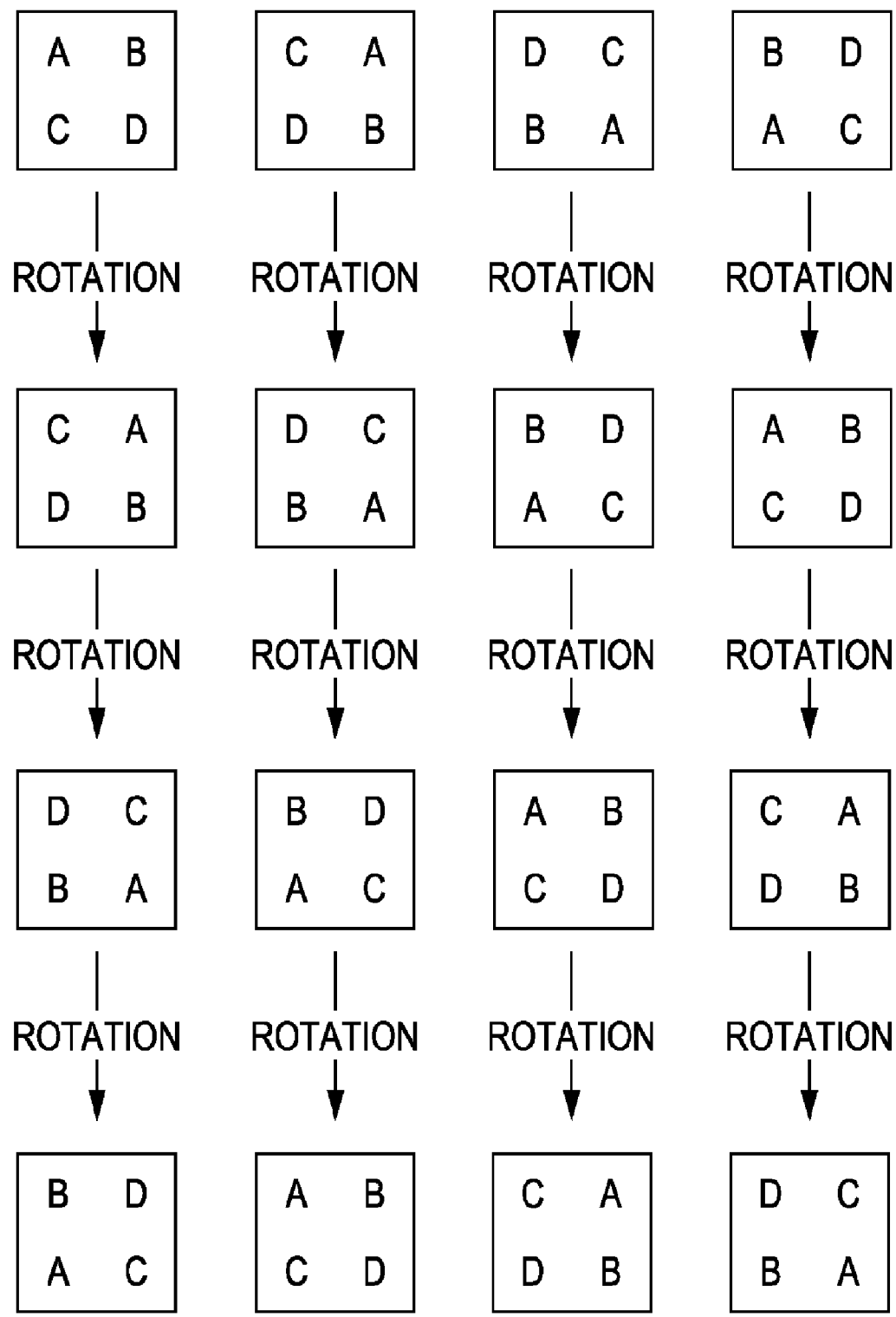
FIG. 12 shows the code patterns of blocks, where even though the code pattern of each of the blocks is rotated to a 90° angle at a time, the rotated pattern becomes the same as one of the code patterns that are not yet rotated.

Further, even though the code pattern of each of the blocks is rotated, the rotated code pattern becomes the same as one of code patterns that are not yet rotated. FIG. 11 shows the code patterns of the blocks. When each of the code patterns 221, 222, 223, and 224 is vertically reversed, the code pattern 221 becomes the code pattern 224, the code pattern 222 becomes the code pattern 223, the code pattern 223 becomes the code pattern 222, and the code pattern 224 becomes the code pattern 221. Here, another code pattern may be used without being limited to those shown in FIG. 11 so long as when the code pattern is rotated, the rotated code pattern becomes the same as one of code patterns that are not yet rotated. For example, even though the code pattern of each of blocks shown in FIG. 12 is rotated to a 90° angle at a time, the rotated pattern becomes the same as one of code patterns that are not yet rotated.

Thus, the code pattern embedded in the block of the image information is generated, as a single code including a combination of the patterns of the sub-blocks. Further, even though each of the patterns of the sub-blocks is rotated, the rotated pattern is identified as the same as the pattern which is not yet rotated. Still further, even though the code pattern of each of the blocks is rotated, the rotated pattern becomes the same as one of the code patterns that are not yet rotated.

The additional information can be multiplexed on the image information according to a known method.

[Embedding of Additional Information]

Figure 13:
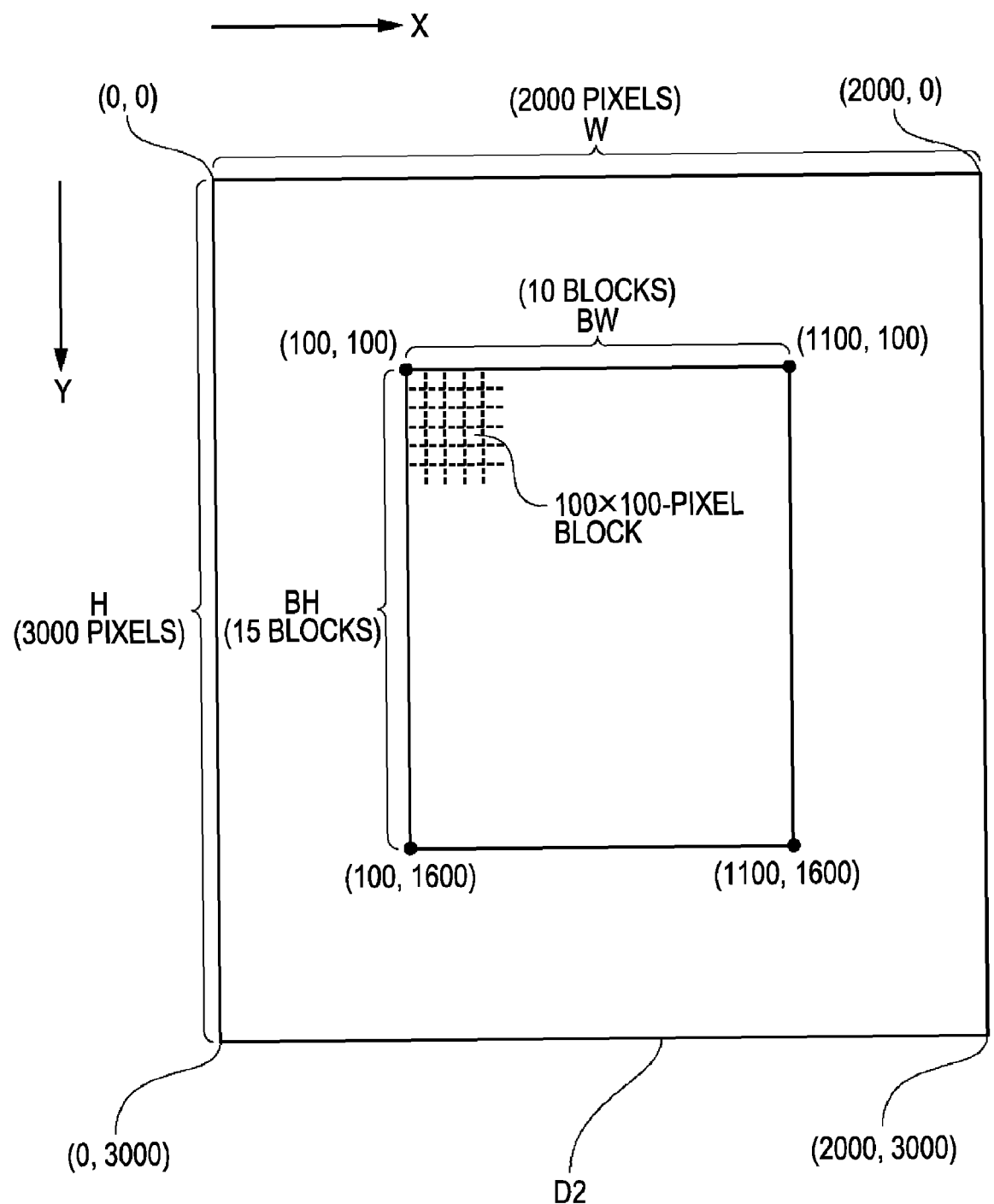
FIG. 13 shows an example relationship between image information and an area where additional information is embedded.

FIG. 13 shows an example relationship between the image information D2 and an area where the additional information X is embedded.

If H×W pixels indicating the size of the image corresponding to the image information D2 are determined to be 2000×3000 pixels, the additional-information-multiplexing unit 14 determines coordinates X and Y=(100, 100) to be the start point, for example. Then, a texture which hardly occurs according to an ordinary error-diffusion method is generated for every 100×100-pixel block, and the additional information X is embedded in the image information D2. Then, the size of the area where the additional information X is embedded is determined to be BW=1000 pixels (10 blocks) and BH=1500 pixels (15 blocks), for example.

According to the above-described embodiment, ten blocks are arranged in the X-axis direction and fifteen blocks are arranged in the Y-axis direction, where each of the blocks includes 100×100 pixels. That is to say, an aggregate of 10×15 blocks is arranged. The area where the additional information X is embedded is a rectangular area surrounded by four vertexes (100, 100), (1100, 100), (100, 1600), and (1100, 1600), as shown in FIG. 13.

When embedding 1-bit data in each of the blocks and the additional information X such as the Exif information is 100 bits of information, the 100-bit information is divided for every single bit. Then, the quantization-threshold value of each of the blocks, where the quantization-threshold value is obtained by the error-diffusion method, is changed according to the value of bit data that should be embedded in the block, and the bit data is embedded in the block. Here, the amount of information that can be embedded in each of the blocks may not correspond to a single bit, but two or more bits. Namely, a predetermined amount of the additional information may be embedded in each of the blocks.

Figure 14:
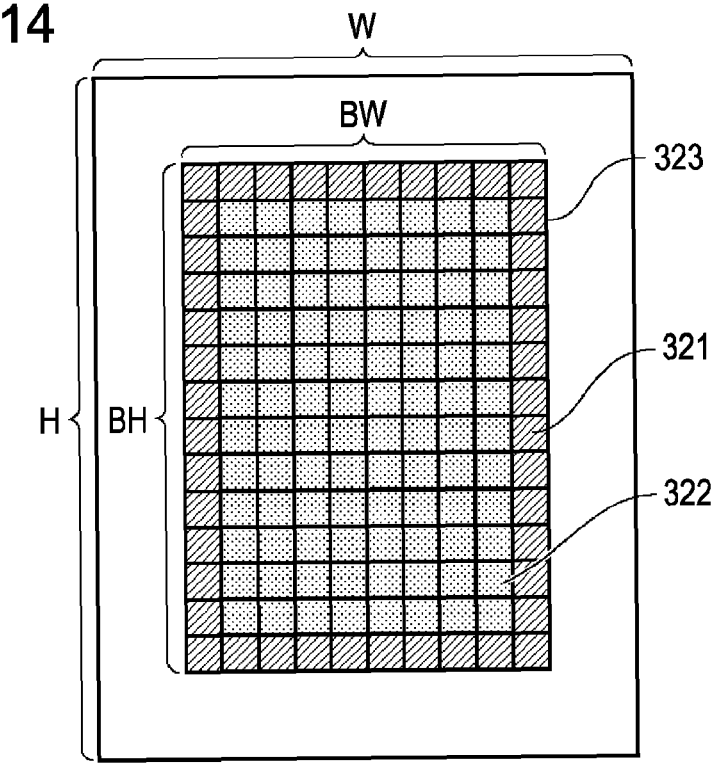
FIG. 14 shows an example where a marker (additional information) indicating information about the position where different additional information is embedded.

Further, additional information that can function as a marker indicating the position of the additional information may be embedded in the block, so as to easily and precisely detect the position of the block where the additional information is embedded. FIG. 14 shows how the markers (the additional information) are embedded, where the markers indicate the position where the additional information is embedded. A single-block-wide marker-embedded area 321 is provided on the outer periphery of an additional-information-embedded area 323, and an embedded area 322 where actual additional information is embedded is provided inside the marker-embedded area 321. Each of the markers indicates "1" or "0", for example.

Further, the markers may not be embedded on the outer periphery of the additional-information-embedded area 323. For example, the marker may be embedded in the vicinity of the four vertexes of the additional-information-embedded area 323. According to another embodiment of the present invention, the marker may be embedded in the vicinity of each of the first and last blocks in advance, where the additional information X is embedded between the first and last blocks.

Thus, the block may not be divided according to the size of the image information D2, the size being determined to be W×H pixels. The area where the additional information X is embedded is defined in the image information D2, and an N×N-pixel block is divided according to the area where the additional information X is embedded, the area being determined to be BW×BH pixels. Here, the inequalities BW of embedded area <W of image information D2 and BH<H hold, and the equalities BW=nN and BH=mN (where each of n and m is a natural number) hold. That is to say, each of the signs BW and BH of the embedded area denotes the multiple of the block size N.

[Processing Procedures Performed to Embed Additional Information]

Figure 15:
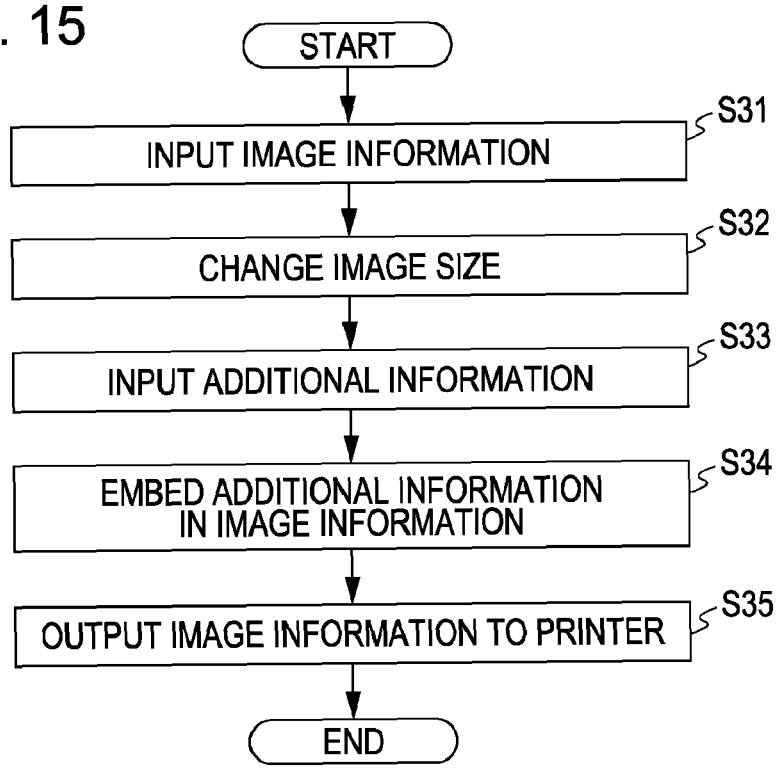
FIG. 15 is a flowchart illustrating processing procedures performed to embed additional information of the adding device.

FIG. 15 is a flowchart illustrating processing procedures performed by the adding device, so as to embed additional information.

First, the image information D1 is input from the input terminal 11, at step S31, and the image-forming unit 13 converts the size of the image information D1 into the print size so that the image information D2 is generated, at step S32.

Next, the additional information X is input from the input terminal 12, at step S33. Then, the additional-information-multiplexing unit 14 defines an area in the image information D2, where the additional information X is to be embedded, and divides the embedding area into two or more N×N-pixel blocks. The quantization-threshold value of each of the blocks, where the quantization-threshold value is obtained by the error-diffusion method, is changed according to a predetermined amount (e.g., a single bit) of additional information X for embedding so that image information D3 is generated, at step S34. Here, the time where the additional information X is input may be the same as the time where the image information D1 is input, or information about the time where the additional information X is transmitted may be input in advance.

Then, the image information D3 where the additional information X is embedded is output to the printer 15, at step S35, and the printer 15 is made to output the printed image 16.

[Extractor]

Figure 16:
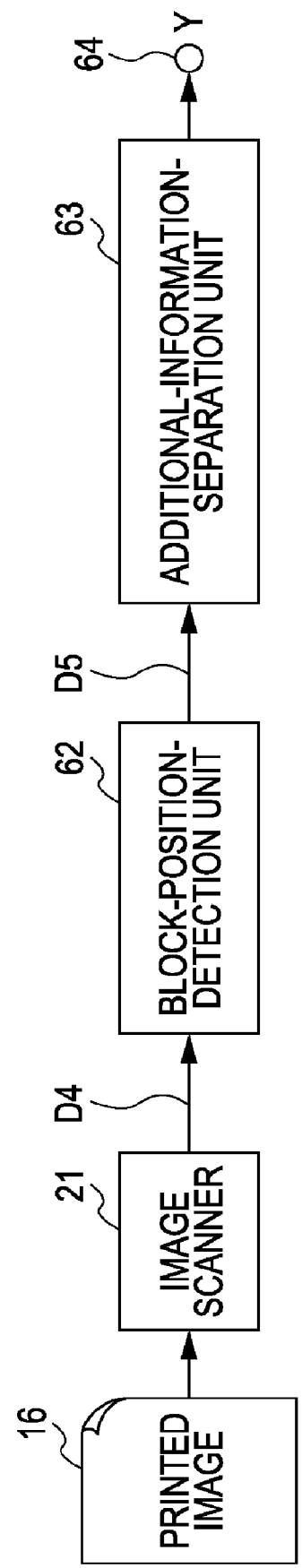
FIG. 16 is a block diagram showing an example configuration of an extractor.

Next, an image-processing device configured to extract the additional information X from the printed image 16 (hereinafter referred to as an extractor) will be described. FIG. 16 is a block diagram illustrating an example configuration of the extractor.

An image scanner 21 optically reads the printed image 16 and outputs image information D4. At that time, the user can place the printed image 16 on a reading mount and/or a document feeder of the image scanner 21 without being aware of the orientation of the area where the additional information is embedded, the additional information being embedded in the printed image 16. Further, the user may not specify an area where the image scanner 21 reads image data.

Figure 17:
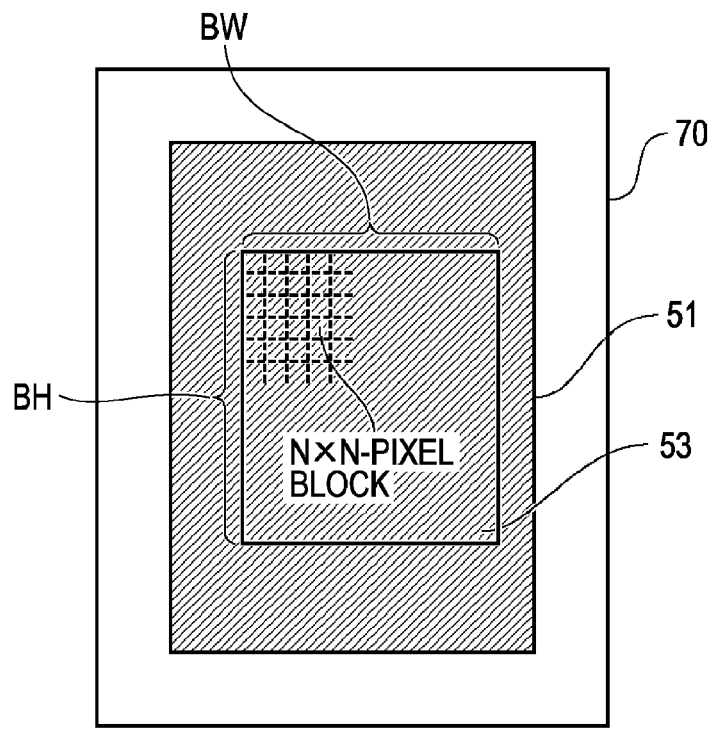
FIG. 17 illustrates the relationship between an area where an image scanner can read image data and a printed image.

FIG. 17 illustrates the relationship between an area 70 where the image scanner 21 can read image data and the printed image 16. Upon being instructed to read the printed image 16 by the user, the image scanner 21 optically reads image data in the readable area 70 covering the entire face of a print medium 51 including an additional-information-embedded area 53, and outputs the image information D4 to the block-position-detection unit 62.

The block-position-detection unit 62 detects the correct position of each of blocks where additional information is embedded, the additional information being multiplexed on the image information D4. Namely, the block-position-detection unit 62 detects the position of each of the above-described blocks for the image information D4 by using a frequency-characteristic amount calculated by analyzing the frequency characteristic of a texture in blocks, where the texture-frequency characteristic is used for separating the additional information X, by shifting the detection position by as much as a single pixel and/or two or more pixels at a time. The details on the above-described block-position detection will be described later. According to another embodiment of the present invention, the block-position-detection unit 62 detects the block position by using a code-determination amount used to make code determination for the additional information X. Then, the block-position-detection unit 62 outputs the image information D4 and image information D5 including block-position information indicating the position of a detected block to an additional-information-separation unit 63.

The additional-information-separation unit 63 retrieves the block-position information from the image information D5, and analyzes the frequency of the texture in blocks for the position of at least one block. Then, the additional-information-separation unit 63 determines a code embedded in each of the blocks, and extracts additional information Y, and outputs the additional information Y to an output terminal 64. Here, a known method is used to separate the additional information.

Additional-information-extraction Processing

If the number of blocks detected by the block-position-detection unit 62 is different from the number of blocks where the additional information X is embedded by the adding device, the extracted additional information Y is different from the additional information X embedded by the adding device, even though the additional information Y is separated from the image information D5.

Figure 18:
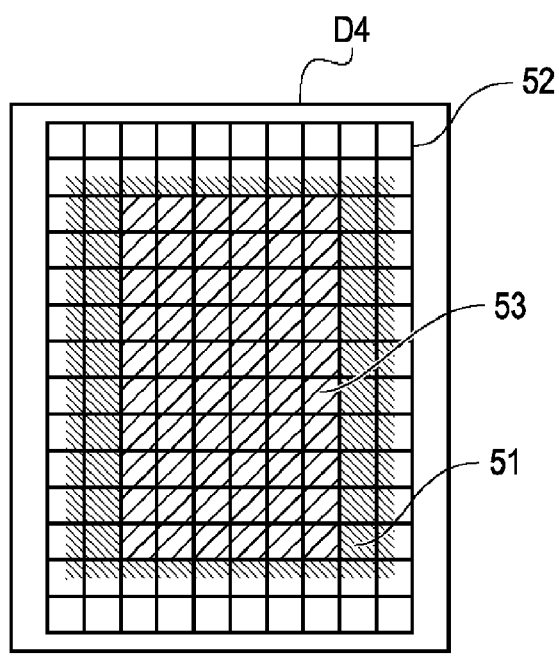
FIG. 18 shows an example where the number of blocks detected by a block-position-detection unit is different from the number of blocks where the additional information is embedded by the adding device.

FIG. 18 shows an example where the number of the blocks detected by the block-position-detection unit 62 is different from the number of the blocks where the additional information X is embedded by the adding device. The configuration shown in FIG. 18 is generated on the precondition that the readable area 70 of the image scanner 21 is larger than the size of the print medium 51. That is to say, the size of an image generated on the basis of the image information D4 is larger than that of the print medium 51. If the block-position-detection unit 62 detects the position of each of the highest number of blocks that can be embedded in the entire area of the image information D4, the block-position information is indicated by a code 52. Therefore, the number of blocks indicated by the block-position information 52 is different from the number of the blocks where the additional information X is embedded.

If the number of the blocks detected by the block-position-detection unit 62 is different from the number of the blocks where the additional information X is embedded, additional-information-extraction processing may be performed, so as to separate the additional information Y from the image information on the basis of the block-position information, and extract the additional information X from the separated additional information Y.

The above-described additional-information-extraction processing performed to extract the additional information X from the additional information Y may be performed in various ways. For example, when the texture-frequency analysis is made in blocks, so as to separate the additional information Y from the image information, data on a frequency-characteristic amount is obtained, as the result of the analysis. The frequency-characteristic-amount data can be used for performing the additional-information-extraction processing. If the frequency-characteristic amount obtained at the position where the additional information is embedded is different from that obtained at the position where the additional information is not embedded, feature extraction is performed for the frequency-characteristic value so that the position of a block where the additional information X is embedded by the adding device can be detected.

Further, when separating the additional information Y from the image information, the texture-frequency analysis is made in blocks, and the code determination is made in blocks. However, the code-determination amount used for making the code determination may be used. If the code-determination amount obtained at the position where the additional information is embedded is different from that obtained at the position where the additional information is not embedded, the feature extraction is performed for each of the code-determination amounts, so as to detect the position of the block where the additional information X is embedded by the adding device.

Further, as described above, if the marker indicating the position of the additional information is embedded in the additional information embedded by the adding device, the additional information Y is separated from the image information, and the marker is detected from the separated additional information Y, whereby the position of the block where the additional information X is embedded by the adding device can be detected.

Direction-determination Processing

When the image scanner 21 reads data on the printed image 16 from an arbitrary direction and extracts the additional information, direction-determination processing may be performed, so as to determine the direction in which the image scanner 21 reads the data on the printed image 16.

According to the direction-determination processing, the orientation of the area where the additional information X is embedded is determined on the basis of the additional information Y separated from the image information by making the code determination in blocks for the block-position information output from the block-position-detection unit 62. There are various methods of determining the orientation of the area where the additional information X is embedded on the basis of the separated additional information Y.

Figures 19, 20:
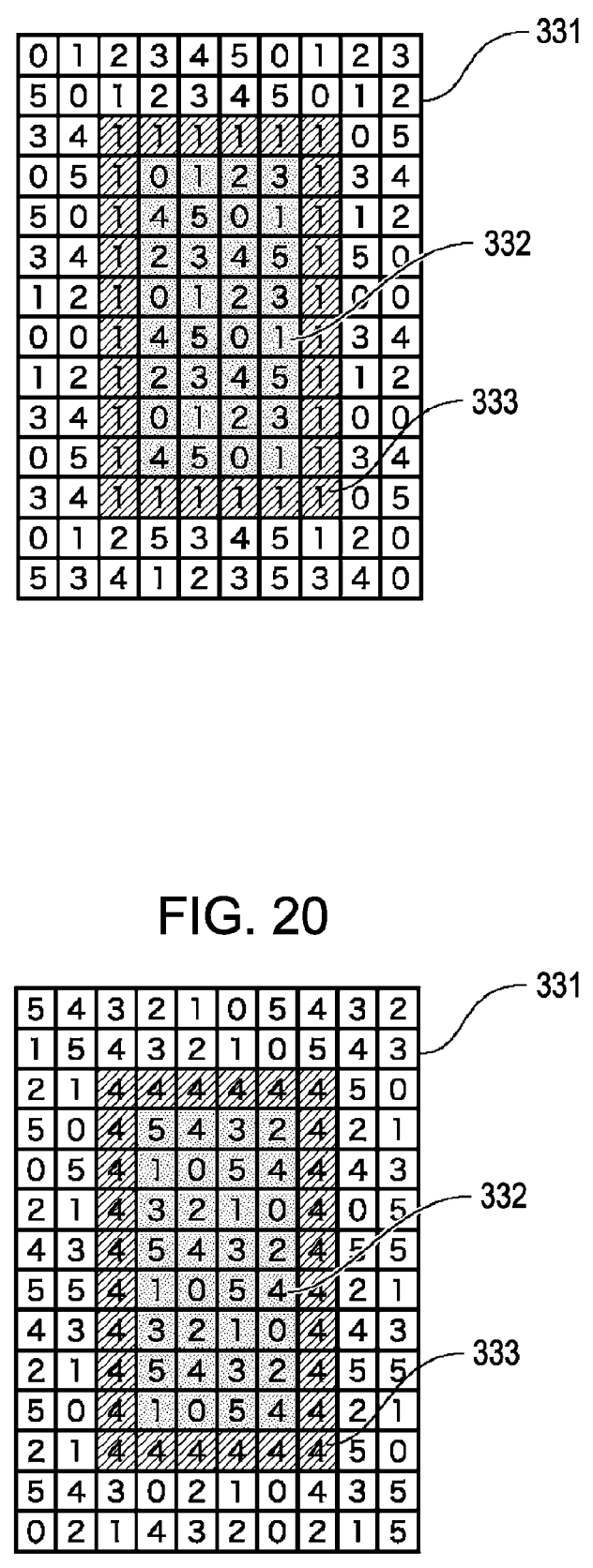

For example, there is the method of determining the orientation of the area where the additional information is embedded on the basis of markers indicating the position of the additional information. FIG. 19 shows the result of separation of the additional information Y from the image information where the orientation of the area of image data read by the image scanner 21 agrees with the orientation of the area where the additional information X is embedded. On the other hand, FIG. 20 shows the result of separation of the additional information Y from the image information where the orientation of the area of the image data read by the image scanner 21 is vertically reversed with reference to the orientation of the area where the additional information X is embedded.

Each of FIGS. 19 and 20 shows the case where the number of blocks detected by the block-position-detection unit 62 is different from the number of blocks where the additional information X is embedded by the adding device, as is the case with FIG. 18. Further, the value of each of the blocks shown in each of FIGS. 19 and 20 shows the value of the additional information Y separated by the additional-information-separation unit 63 for a block set 331, that is, a set of a 14 by 10 matrix of blocks (140 blocks in total) detected by the block-position-detection unit 62. The additional information X is embedded in a block set 332 included in the block set 331. Further, a block set 333 included in the block set 331 functions as a maker.

The adding device embeds data '1', as the marker. Further, as described above, the code pattern of each of the blocks is generated so that if the code pattern is rotated, the rotated code pattern becomes the same as any one of the code patterns that are not yet rotated, and there is a rule that the data '1' is converted into data '4' when the code pattern is vertically reversed. In that case, if the orientation of the area showing the image data read by the image scanner 21 agrees with the orientation of the area showing the additional information X, the block set 333 where data on the markers '1' is embedded is detected around the block set 332 including the additional information X. Further, if the orientation of the area of the image data read by the image scanner 21 is vertically reversed with reference to the orientation of the area where the additional information X is embedded, the block set 333 where data on the markers '4' is embedded is detected around the block set 332 including the additional information X.

Subsequently, if the value of each of the markers on which data is embedded in the block set 333 is extracted and determined to be '1', it is determined that the orientation of the area showing the image data read by the image scanner 21 agrees with the orientation of the area showing the additional information X. Further, when the value of each of the markers is determined to be '4', the orientation of the image on which data is read by the image scanner 21 is vertically reversed with reference to the orientation of the area showing the additional information X. It becomes possible to correctly extract the additional information X by converting the code pattern on which data is separated from the image information D4 into the code pattern obtained when the orientation of the area showing the image information D4 agrees with the orientation of the area showing the additional information X on the basis of the relationship between the orientation of the area showing the image information D4 and the orientation of the area showing the additional information X.

The orientation of the area showing the additional information X can be determined by using the method of embedding marker data in each of four corners of the area where the additional information is embedded, the method of inserting a data stream used to make direction determination between data streams obtained by dividing the data stream of the additional information X at predetermined intervals, the method of inserting predetermined code data in the first and last blocks of the additional information X, and so forth. If marker data indicating the position and/or rotation direction of the additional information X can be embedded and the marker data can be detected on the basis of the method and/or the rule by which the marker data is embedded, the orientation of the area showing the additional information X can be determined. In other words, if predetermined information indicating the position and/or orientation of the area showing the additional information X can be embedded in the image information, the orientation of the area showing the additional information X can be detected through the direction-determination processing.

[Additional-information-extraction Processing]

Figure 21:
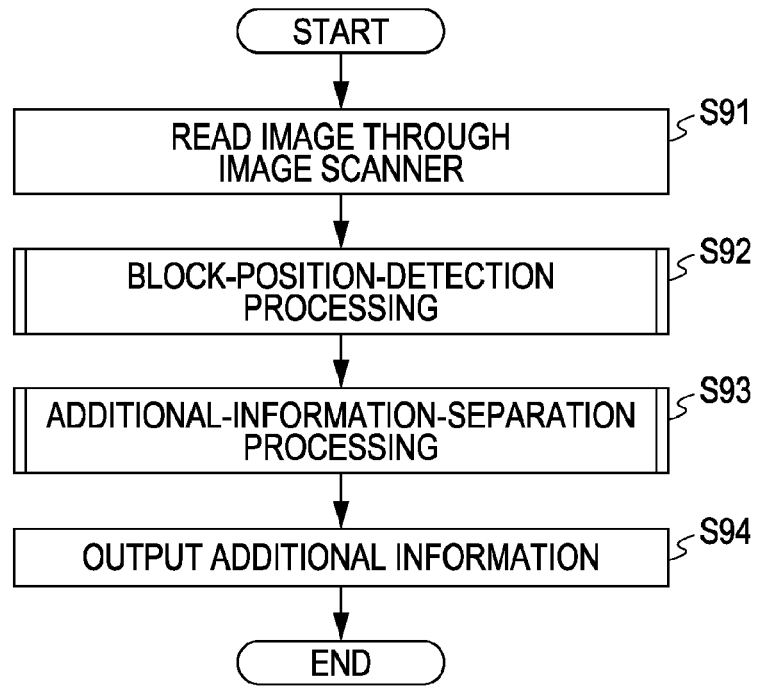
FIG. 21 is a flowchart showing processing procedures performed by the extractor, so as to extract the additional information.

FIG. 21 is a flowchart illustrating processing procedures performed by the extractor, so as to extract the additional information.

First, the image scanner 21 optically reads data on the printed image 16 and generates the image information D4, at step S91. Next, the block-position-detection unit 62 detects the block position from the image information D4, at step S92. The block-position information indicating the block position and the image information D4 are input to the additional-information-separation unit 63, as the image information D5. Next, the additional-information-separation unit 63 analyzes the frequency characteristic of the texture of each of the blocks on the basis of the block-position information, and separates the additional information Y from the image information D5, at step S93. Then, the additional-information-separation unit 63 extracts the additional information X from the additional information Y, as required, and the separated additional information Y and/or the extracted additional information X is output from the output terminal 64, at step S94.

[Block-position-detection Unit]

Figure 22:
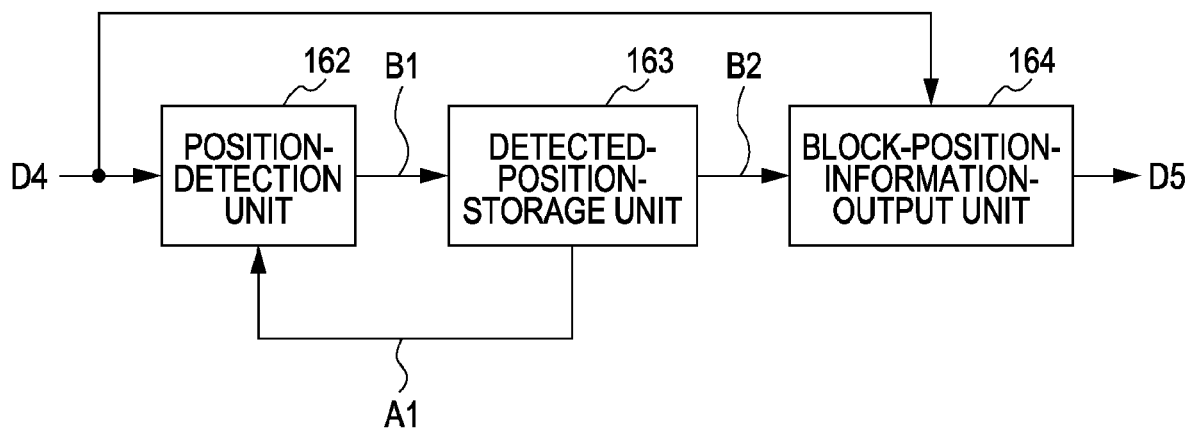
FIG. 22 is a block diagram showing an example configuration of a block-position-detection unit in detail.

FIG. 22 is a block diagram showing an example configuration of the block-position-detection unit 62 in detail. Upon receiving the image information D4 and detection-area information A1, the position-detection unit 162 detects the block position from an area defined on the basis of the detection-area information A1, and outputs block-position information B1.

Figure 23:
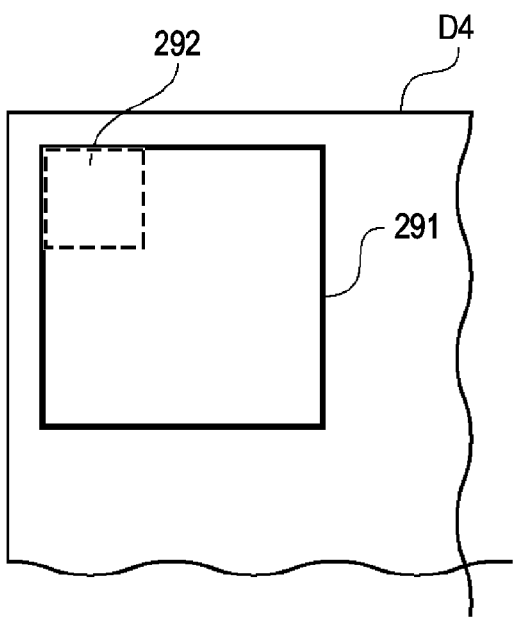
FIG. 23 illustrates operations of a position-detection unit.

FIG. 23 illustrates operations of the position-detection unit 162. For example, when the detection-area information A1 indicates a detection area 291 defined on the image information D4, the position-detection unit 162 performs block detection in the detection area 291. The position-detection unit 162 shifts the position of a block 292 of a predetermined size in pixels in the detection area 291, and analyzes the frequency of the texture of the block 292, and performs additional-information-separation processing. Then, the position-detection unit 162 calculates a frequency-characteristic value obtained as the frequency-analysis result and an additional-information-determination value used to separate the additional information from the image information, and detects the block position. That is to say, the frequency-characteristic value and the additional-information-determination value can be used to detect the block position, since the value of a block where the additional information is embedded is different from that of a block where the additional information is not embedded.

A detection-position-storage unit 163 stores the block-position information B1 in a memory such as the RAM 24 and determines whether or not the block-position-detection processing should be continued. If it is determined that the block-position-detection processing should be continued, the detection-position-storage unit 163 resets the detection-area information A1, as required, and instructs the position-detection unit 162 to continue performing the block-position-detection processing. Then, the detection-position-storage unit 163 updates the block-position information B1 stored in the memory on the basis of the block-position information B1 output from the position-detection unit 162. If it is determined that the block-position-detection processing should not be continued, the detection-position-storage unit 163 outputs the information about the position of at least one block, the information being stored in the memory, as the block-position information B2.

A block-position-information-output unit 164 calculates block-position information B3 on the basis of the block-position information B2, and outputs the block-position information B3 and the image information D4, as the image information D5. Details on the above-described procedures will be described later.

Figure 24:
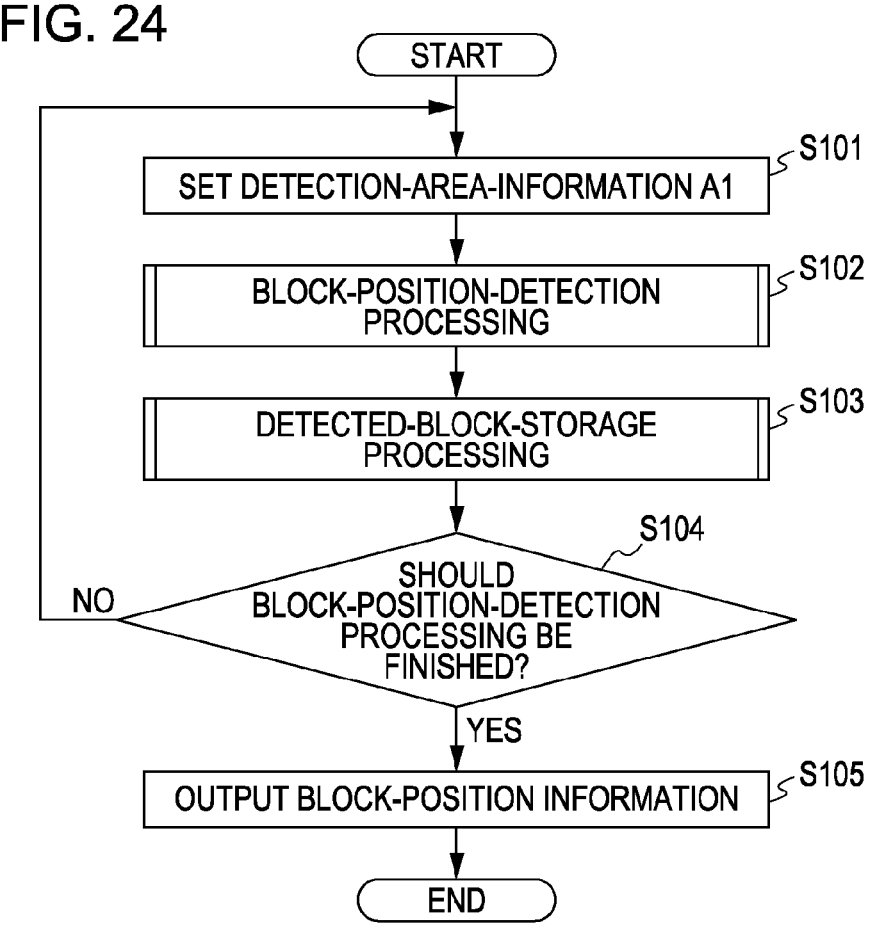
FIG. 24 is a flowchart illustrating processing performed by the block-position-detection unit.

FIG. 24 is a flowchart illustrating processing performed by the block-position-detection unit 62. First, the detection-area-information A1 is determined, at step S101. Then, the image information D4 and the detection-area information A1 are input to the position-detection unit 162, and the block-position-detection processing is performed, at step S102. Next, the detection-position-storage unit 163 stores the block-position information B1 in the memory (detected-block-storage processing), at step S103. Then, it is determined whether or not the block-position-detection processing performed at step S102 should be continued on the basis of the relationship between the block-position information B1 stored in the memory and the detection-area information A1, at step S104. If it is determined that the block-position-detection processing should be continued, the processing returns to step S101 so that the detection-area information A1 is reset, as required. If it is determined that the block-position-detection processing should not be continued, the block-position information B2 stored in the memory is output, at step S105.

Details on Block-position-detection Processing

Figure 25:
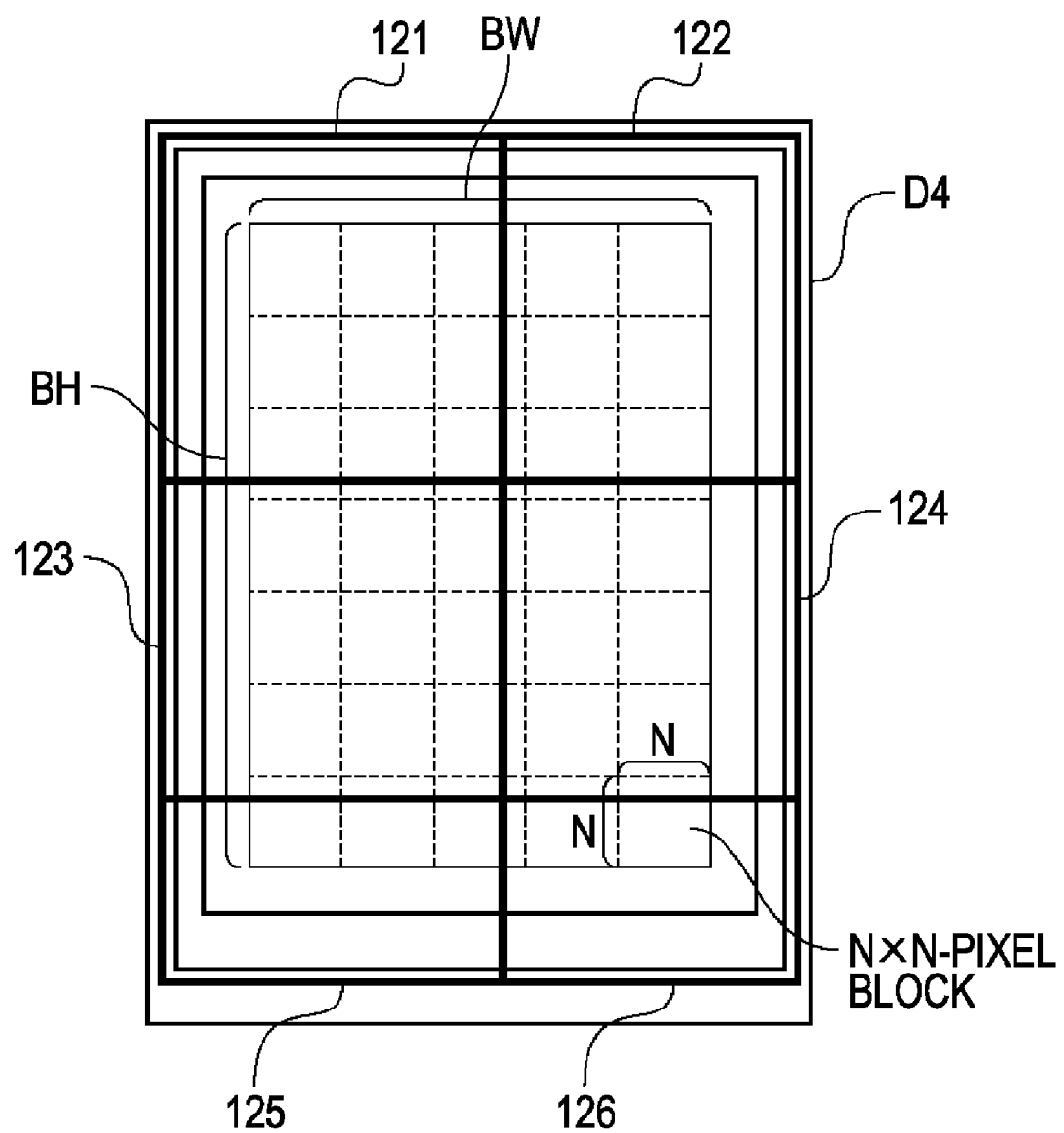
FIG. 25 shows the state where detection areas are arranged in the area of image information output from the image scanner.

FIG. 25 shows the state where detection areas 121, 122, 123, 124, 125, and 126 are arranged in the area of the image information D4 output from the image scanner 21. Here, no restriction is put on the size, position, and number of the detection area. Further, the detection area may be defined in advance, or defined according to the image information D4. Further, after the block-position information B1 corresponding to a single block is generated temporarily, the next detection area may be defined. Still further, the area of the image information D4 may be divided in four areas, and the four areas may be determined to be detection areas. Otherwise, the spacing (width and height) of the detection area may be defined as the detection-area information A1, and detection areas may be defined in sequence according to the spacing.

Figure 26:
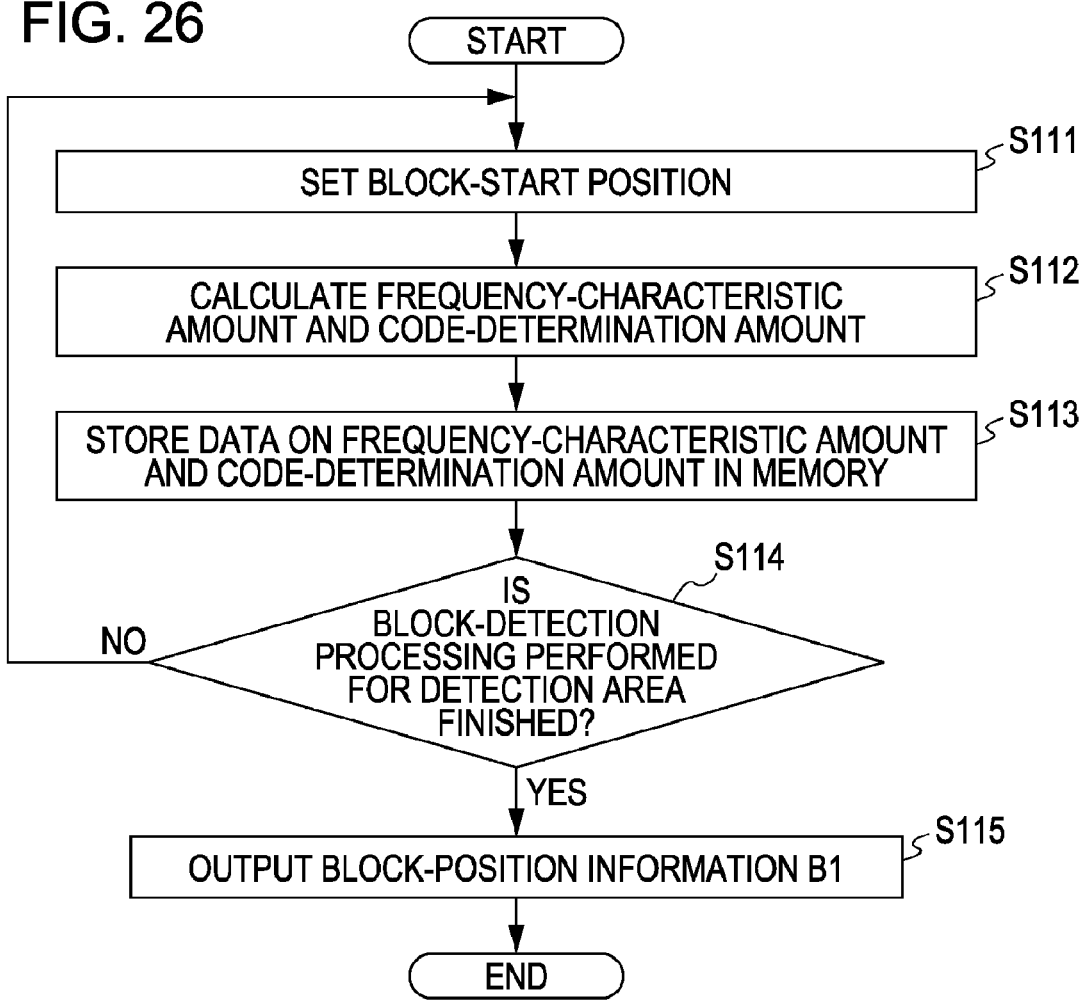
FIG. 26 is a flowchart illustrating processing procedures performed to detect the block position.

FIG. 26 is a flowchart illustrating the block-position-detection processing performed at step S102 in detail. First, a block-start position is determined, at step S111, where the block-start position functions as the reference position when the additional information is separated. Next, the frequency-characteristic amount is calculated by analyzing the frequency of the texture in processing blocks 262 from the block-start position, and the code-determination amount is calculated by making code determination in the processing blocks 262 on the basis of the frequency-characteristic amount, at step S112. Next, data on the calculated frequency-characteristic amount and data on the calculated code-determination amount are stored in the memory in sequence, at step S113, and it is determined whether or not the block-position-detection processing performed in detection areas is finished, at step S114. If the block-position-detection processing performed in the detection areas is not finished, the processing returns to step S111. If the block-position-detection processing is finished, the position of a block arranged in the detection area is calculated on the basis of the frequency-characteristic-amount data and the code-determination-amount data that are stored in the memory, and the block-position information B1 is output, at step S115.

For example, a 100×100-pixel area is defined, as the detection area. When the block-start position is set, at step S111, a single pixel is selected from among 10000 pixels provided in the detection area, and the position of the selected pixel is determined to be the block-start position.

According to the calculation of the frequency-characteristic amount and the code-determination amount, the calculation being performed, at step S112, the frequency-characteristic amount is calculated by analyzing the texture frequency in the processing blocks 262 from the block-start position, and the code-determination amount is calculated in the processing blocks 262 on the basis of the frequency-characteristic amount. Then, the block position is calculated on the basis of the fact that the frequency-characteristic amount and the code-determination amount of a block where the additional information is embedded are different from those of a block where no additional information is embedded.

Figure 27:
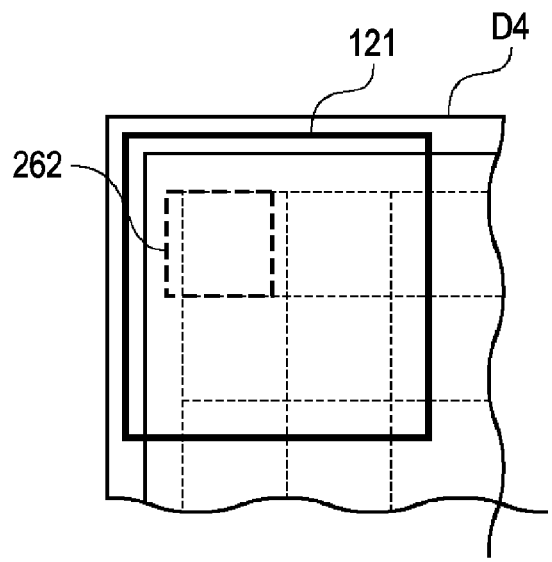
FIG. 27 shows the state where the position of a processing block does not agree with the position of a block where the additional information is embedded during the block-position-detection processing.
Figure 28:
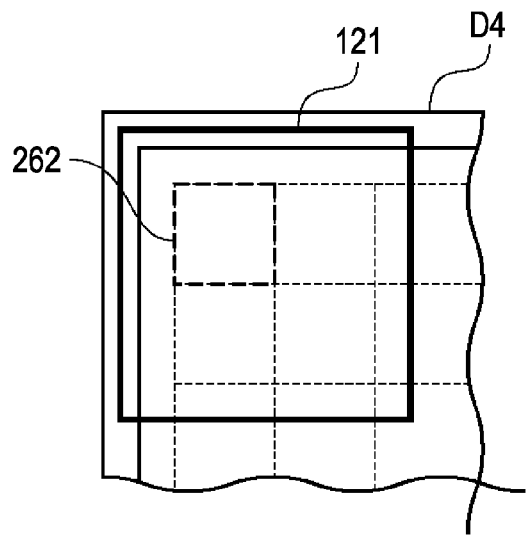
FIG. 28 shows the state where the position of the processing block agrees with the position of the block where the additional information is embedded during the block-position-detection processing.

FIG. 27 shows the state where the position of the processing block 262 does not agree with the position of a block where the additional information is embedded during the block-position-detection processing. FIG. 28 shows the state where the position of the processing block 262 agrees with the position of the block where the additional information is embedded during the block-position-detection processing. If the frequency-characteristic amount and the code-determination amount are calculated at step S112 when the position of the processing block 262 does not agree with the position of the block where the additional information is embedded, as shown in FIG. 27, the value of the code-determination amount becomes 10, for example. On the contrary, if the frequency-characteristic amount and the code-determination amount are calculated at step S112 when the position of the processing block 262 agrees with the position of the block where the additional information is embedded, as shown in FIG. 28, the value of the code-determination amount becomes 50, for example.

At step S113, the data on the frequency-characteristic amount and the code-determination amount that are calculated at step S112 is stored in the memory. However, the data on one of the frequency-characteristic amount and the code-determination amount may be stored in the memory.

At step S114, it is determined whether or not the block-position-detection processing performed for the detection area is finished. However, according to the above-described embodiment, it is determined whether or not the block-position-detection processing performed for a 100×100-pixel-detection area is finished. Further, the amount of movement of the processing block 262 in the detection area may be not only the single pixel, but two pixels. Otherwise, the amount of movement of the processing block 262 may be randomly determined. Further, the processing block 262 may be moved in a staggered manner.

At step S115, the block-position information B1 is output. In the above-described embodiment, however, the block position is calculated on the basis of the amount of code determination made for ten thousand pixels, where data on the code-determination amount is stored in the memory.

Figure 29:
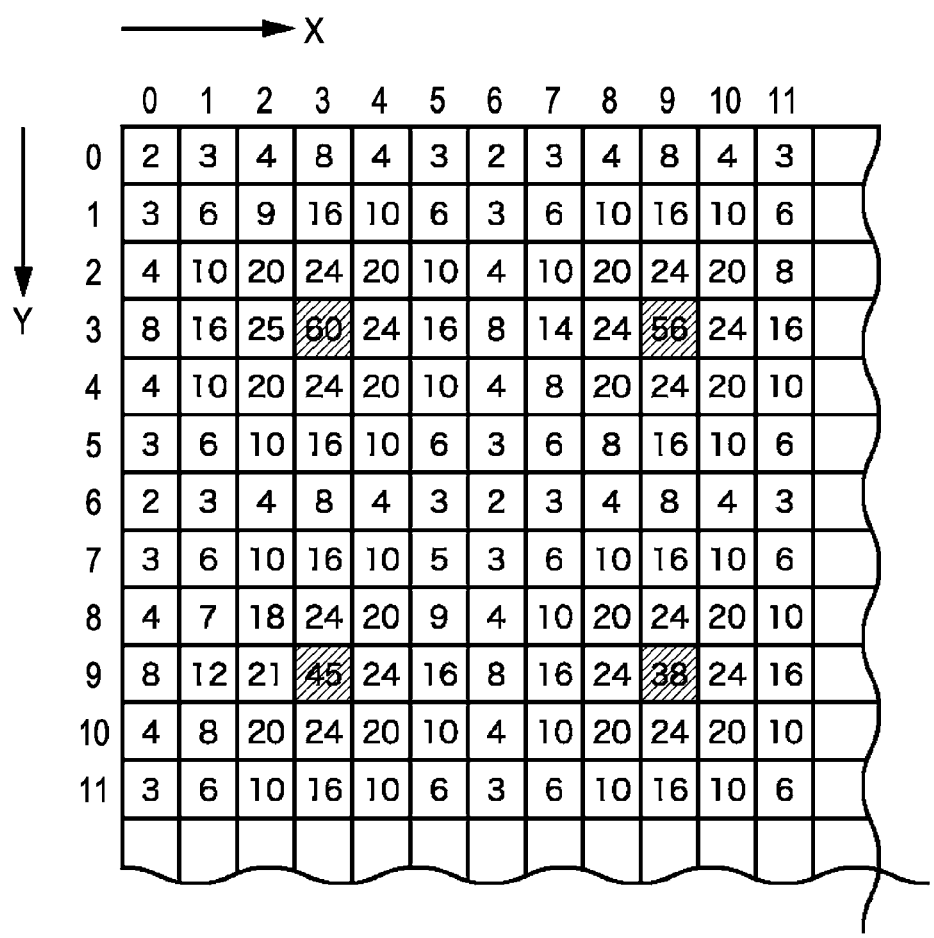
FIG. 29 shows how the block position is calculated.

FIG. 29 illustrates how the block position is calculated. The value of each of squares indicates an example code-determination amount calculated by shifting the processing block 262 by as much as a single pixel at a time.

For example, there is a rule that as the calculated code-determination amount of the processing block 262 increases, the possibility that the position of the processing block 262 agrees with the position of a block where the additional information is embedded increases. According to the above-described fact, it becomes possible to detect the position of the processing block 262 with the calculated code-determination amount higher than those of blocks surrounding the processing block 262, and calculate the block position. For example, the code-determination amount corresponding to coordinates X and Y=(3, 3) is 60, the code-determination amount corresponding to coordinates (9, 3) is 56, the code-determination amount corresponding to coordinates (3, 9) is 45, and the code-determination amount corresponding to coordinates (9, 9) is 38, as shown in FIG. 29. Each of the above-described code-determination amounts is larger than those corresponding to coordinates surrounding the above-described coordinates. Subsequently, the position of the processing block 262, the position being determined at the time where each of the code-determination amounts corresponding to the above-described positions is obtained, corresponds to the block position. In the above-described embodiment, the possibility that the position of the processing block 262 agrees with the position of the block where the additional information is embedded increases as the calculated code-determination amount of the processing block 262 increases. However, if another method is used to embed the additional information in the image information, the possibility that the position of the processing block 262 agrees with the position of the block where the additional information is embedded increases as the calculated code-determination amount of the processing block 262 decreases. Therefore, either of the above-described methods may be used.

Figures 30, 31:
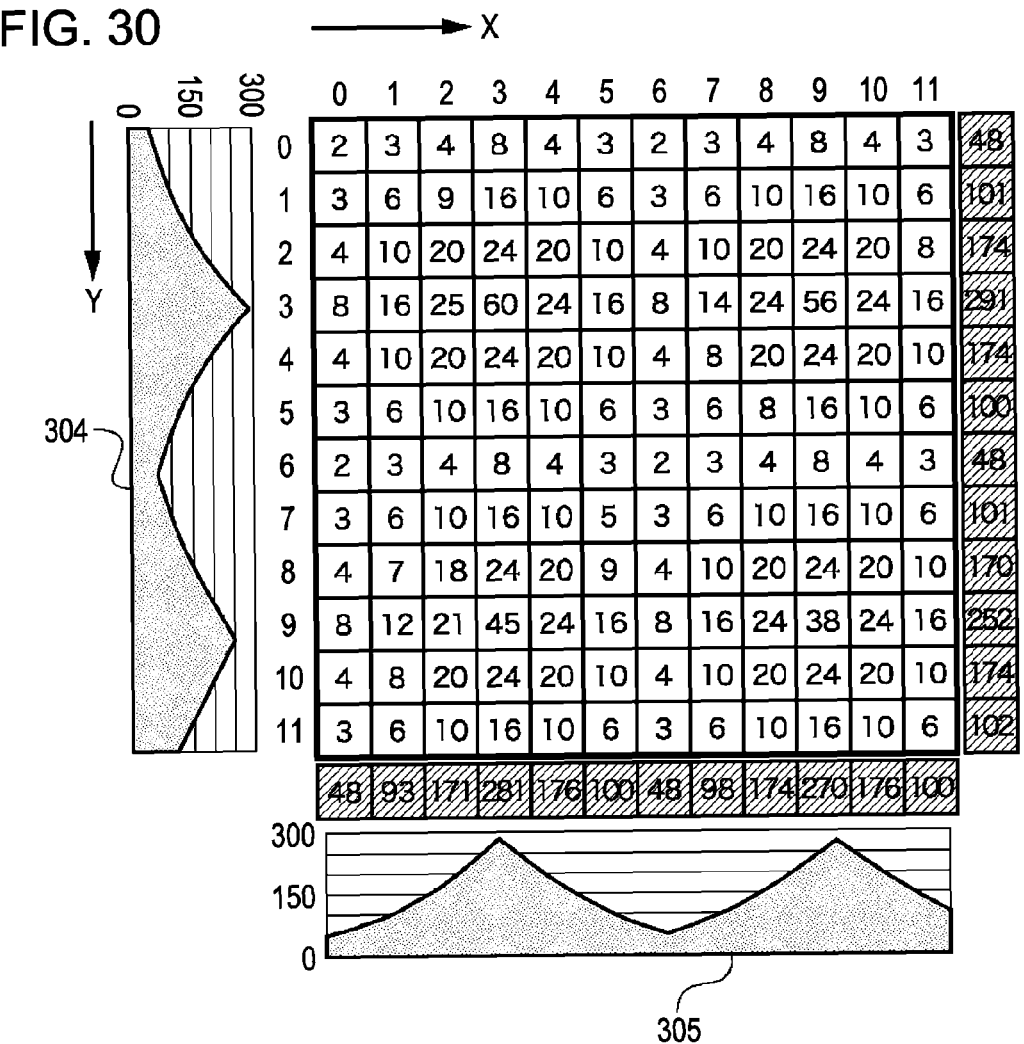
FIG. 30 shows the result of adding the code-determination amounts of squares shown in FIG. 29 to one another in each of the X-axis direction and the Y-axis direction.
FIG. 31 shows the result of adding the code-determination amounts shown in FIG. 29 to one another in 6×6-pixel blocks based on the premise that the 6×6-pixel block is used.

FIG. 30 shows the result of adding the code-determination amounts of the squares shown in FIG. 29 to one another in the X-axis direction and the Y-axis direction. There is a method of calculating the X and Y coordinates of the processing block 26 corresponding to the block position where the additional information is embedded on the basis of the addition results shown in FIG. 30. In FIG. 30, the addition results are shown by using graphs 304 and 305. The positions of the peaks shown in the graphs 304 and 305 correspond to the X and Y coordinates of the processing block 262 corresponding to the position of the block where the additional information is embedded. Further, the intervals between the peak positions indicate that the additional information is embedded in a 6×6-pixel block.

Further, if the size of a block where the additional information is embedded can be estimated, the block position may be calculated on the basis of the result of adding the code-determination amounts to one another, that is to say, the addition is performed in blocks. If the size of the above-described block is estimated at 6×6 pixels, the code-determination amounts 301 corresponding to 6×6-pixel blocks are added to one another. More specifically, the position of the upper left coordinates (0, 0) is determined to be the reference position, and the code-determination amounts obtained at the positions of the coordinates (0, 0), (6, 0), (0, 6), and (6, 6) are added to one another. In FIG. 29, for example, the value of the above-described addition is eight. Further, if the above-described addition is performed for a 6×6-pixel block obtained by shifting the above-described 6×6-pixel block by as much as a single pixel in the X direction, the code-determination amounts obtained at the positions corresponding to the coordinates (1, 0), (7, 0), (1, 6), and (7, 6) are added to one another. The total of the above-described code-determination amounts becomes twelve. The above-described processing is repeated by as much as the 6×6-pixel block. FIG. 31 shows the result of adding the code-determination amounts shown in FIG. 29 to one another in 6×6-pixel blocks based on the premise that the 6×6-pixel block is used. As shown in FIG. 31, the maximum value of the total of the code-determination amounts is 199 obtained at the coordinates (3, 3), and blocks where the additional information is embedded are arranged in 6×6 pixels from the position corresponding to the processing block 262 provided at the position of the coordinates (3, 3).

Thus, the block position can be calculated by obtaining the peak value (and/or the bottom value) on the basis of the value obtained by adding the code-determination amounts to one another in pixels, predetermined number of pixels, blocks, or lines. In another embodiment of the present invention, the block position may be calculated by obtaining the peak value (and/or the bottom value) by multiplying the code-determination amount by a filter coefficient in pixels, predetermined number of pixels, blocks, or lines. Of course, the block position may be calculated on the basis of not only the code-determination amount, but also the frequency-characteristic amount.

Details on Detected-block-storage Processing

During the detected-block-storage processing performed at step S103, items of block-position information B1 output during the block-position-detection processing performed at step S102 are sequentially stored in the memory. For example, when the six detection areas 121 to 126 shown in FIG. 25 are set, the block-position information B1 corresponding to each of the detection areas 121 to 126 is stored in the memory.

Details on Determination Whether or not Block-position-detection Processing is Finished During the determination whether or not the block-position-detection processing is finished, the determination being made at step S104, it is determined whether or not the block-position-detection processing performed in each of the detection areas that are set on the basis of the detection-area information A1 is finished, the processing being performed at step S102. For example, if the six detection areas 121 to 126 are set on the basis of the detection-area information A1, as shown in FIG. 25, it is determined whether or not the block-position-detection processing is performed in each of the detection areas 121 to 126. Then, if the block-position-detection processing should be continued, that is to say, if the block-position-detection processing is not finished in at least one of the detection areas 121 to 126, the processing returns to step S102 where the block-position-detection processing is performed. If the block-position-detection processing should not be continued, the block information B1 stored in the memory is output, as the block information B2. The determination whether or not the block-position-detection processing should be continued may be made by defining the detection area on the basis of the input image information D4 and determining whether or not the processing performed by the block-position-detection unit 162 is finished. Further, the determination whether or not the block-position-detection processing should be continued may be made on the basis of the block-position information B1.

For example, the size of an image obtained on the basis of the image information D4 shown in FIG. 25 is determined to be 1000×1200 pixels, and the detection-area information A1 includes start-point information (0, 0) and data on the size of the detection area, where the size is determined to be 500×500 pixels. In that case, when the detection area is determined, so as not to stray outside the size of the image information D4, the opposite-angle vertexes of the detection areas 121 to 124 are shown, as below.

detection area 121 . . . (0, 0)(500, 500)
    detection area 122 . . . (500, 0)(1000, 500)
    detection area 123 . . . (0, 500)(500, 1000)
    detection area 124 . . . (500, 500)(1000, 1000)

When the size of the detection area set in the detection-area information A1 is 500×500 pixels, each of the detection areas 125 and 126 goes out of the image size of the image information D4. Therefore, the processing may be terminated without performing the block-position-detection processing in each of the detection areas 125 and 126. Further, the opposite-angle vertexes of the detection areas 125 and 126 may be determined to be (0, 1000) (500, 1200), and (500, 1000) (1200, 1200), respectively, according to the image size of the image information D4. That is to say, the size of the detection area may be redetermined to be 500×200 pixels, the block-position-detection processing may be performed in each of the detection areas 125 and 125, and the processing may be terminated.

Details on Block-Position-Information-Output Processing

During the block-position-information-output processing performed at step S105, the block-position information B3 about the entire image information D4 is calculated on the basis of the block-position information B2. Then, the image information D5 including the calculated block-position information B3 and the image information D4 is output.

Figure 32:
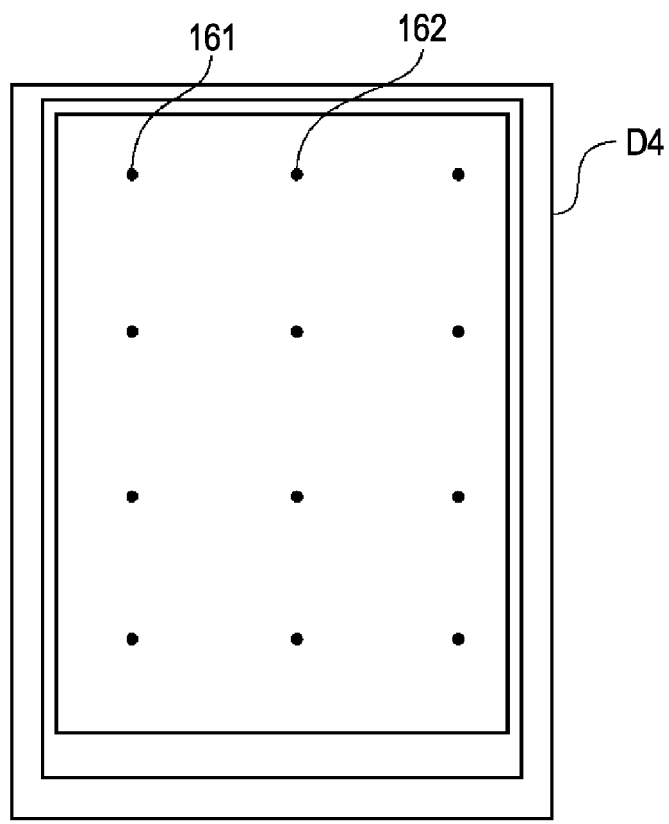
FIG. 32 shows the relationship between image information and block-position information.

FIG. 32 illustrates the relationship between the image information D4 and the block-position information B2. In FIG. 32, the block-position information B2 detected in the image information D4 is indicated by black circles (●) 161 and 162. For calculating the block-position information B3 on the basis of the block-position information B2 indicated by the black circles 161 and 162, the formulas of known internally-dividing-point calculation and known externally-dividing-point calculation are used. The above-described calculations are performed on the basis of the size of the N×N-pixel block which is set in advance.

For example, if the size of the N×N-pixel block is determined to be 200×200 pixels, the coordinates of the block-position information 161 are determined to be (300, 100), and the coordinates of the block-position information 162 are determined to be (704, 100), for example. In that case, the distance in the X direction between the block-position information 161 and the block-position information 162 is 704−300=404 pixels. When the 404 pixels corresponding to the above-described distance is divided by 200 pixels, since the size of the N×N-pixel block is 200×200 pixels, the answer to the above-described division becomes 2.02. Therefore, it can be estimated that two blocks are provided in the X direction between the block-position information 161 and the block-position information 162.

Next, when the internally dividing point of the distance between the block-position information 161 and the block-position information 162 is calculated, a block exists at the position corresponding to coordinates (502, 100). Further, when the externally dividing point of the distance between the block-position information 161 and the block-position information 162 is calculated, another block exists at the position corresponding to coordinates (98, 100). Thus, it becomes possible to calculate the block-position-information B3 indicating the position of the block existing in the image information D4 by calculating the internally-dividing point and the externally-dividing point on the basis of the block-position information B2.

Figure 33:
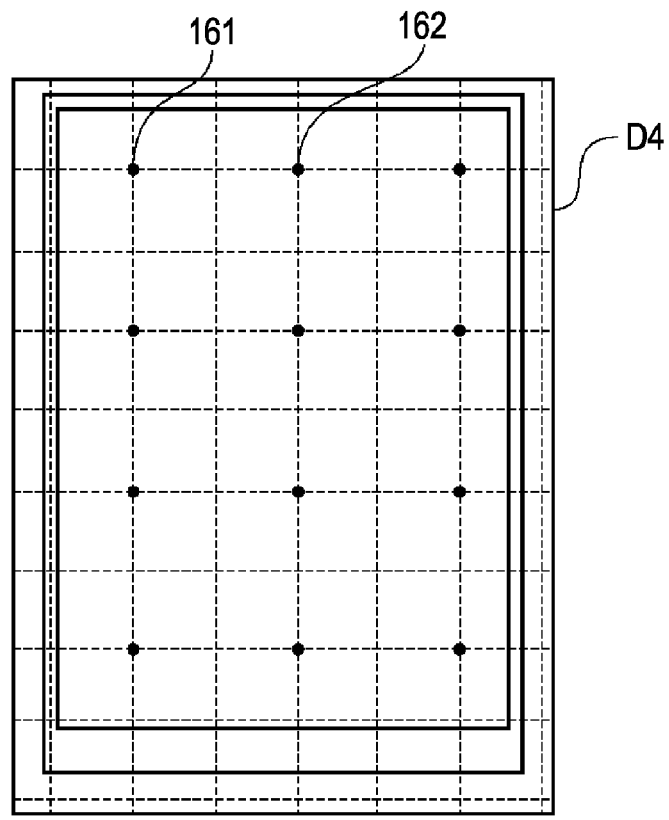
FIG. 33 shows the state where calculated block-position information is plotted on the image information.

FIG. 33 shows the state where the calculated block-position information B3 is plotted on the image information D4. The intersection point of broken lines corresponds to the block position indicated by the block-position information B3, and an area surrounded by the broken lines denotes the N×N-pixel block.

Figure 1:
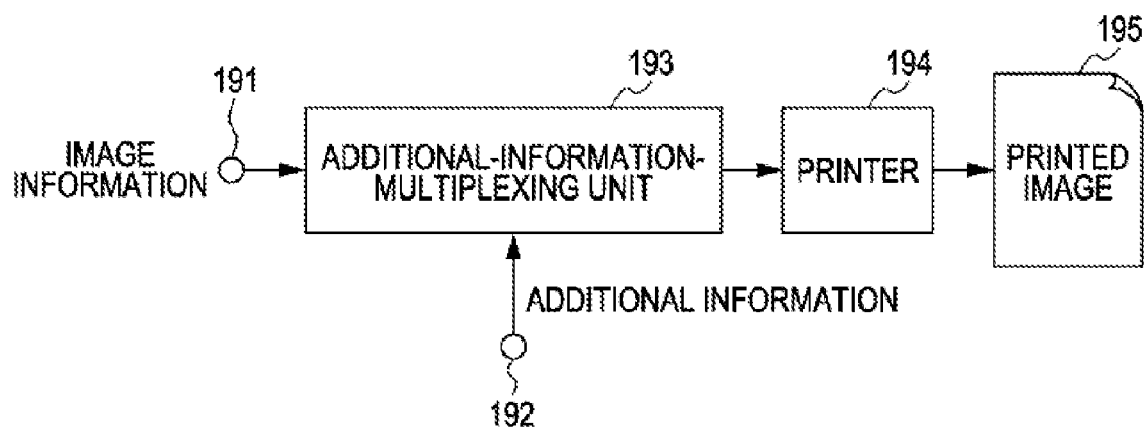
FIG. 1 is a block diagram showing the configuration of an image-processing device configured to embed additional information in arbitrary image data and print the image.
Figure 2:
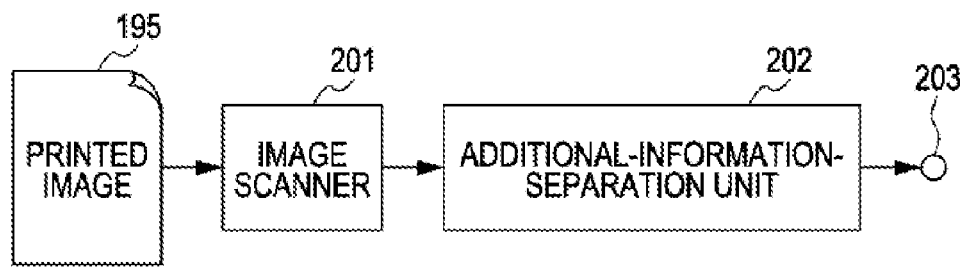
FIG. 2 is a block diagram showing the configuration of an image-processing device configured to retrieve additional information embedded in image information from a printed image obtained as an output of the image-processing device shown in FIG. 1.
Figure 3:
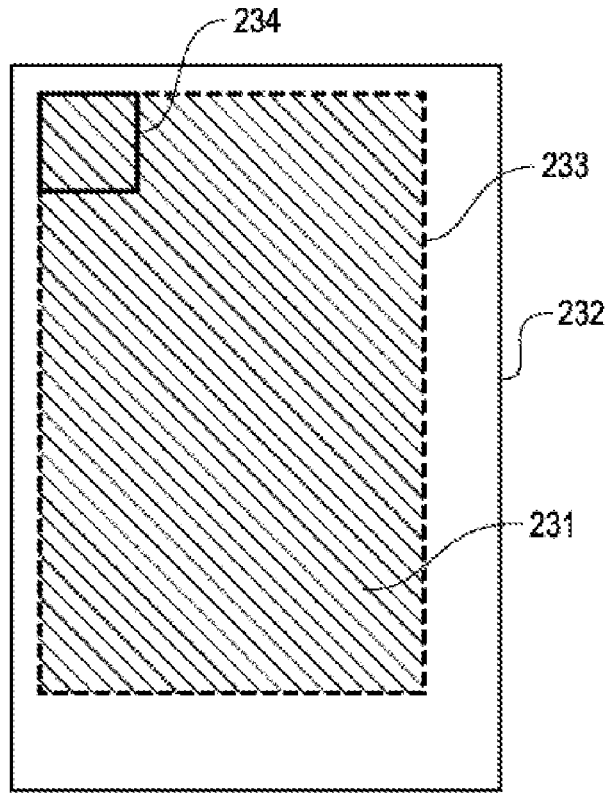
FIG. 3 shows the overview of a printed matter attained according to a known technology.
Figure 4:
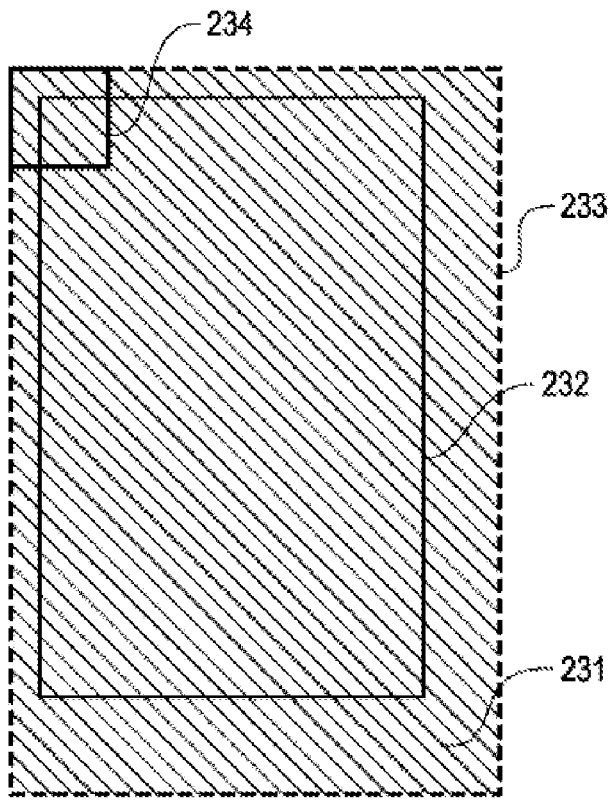
FIG. 4 shows an example where borderless printing is performed for the printed matter attained according to the known technology.
Figure 5:
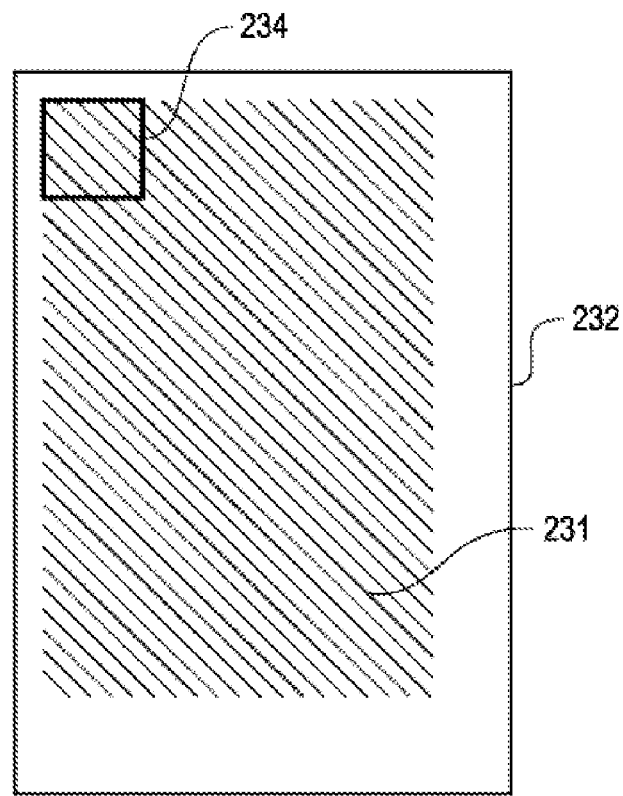
FIG. 5 shows the overview of a printed matter attained according to another known technology.
Figure 6:
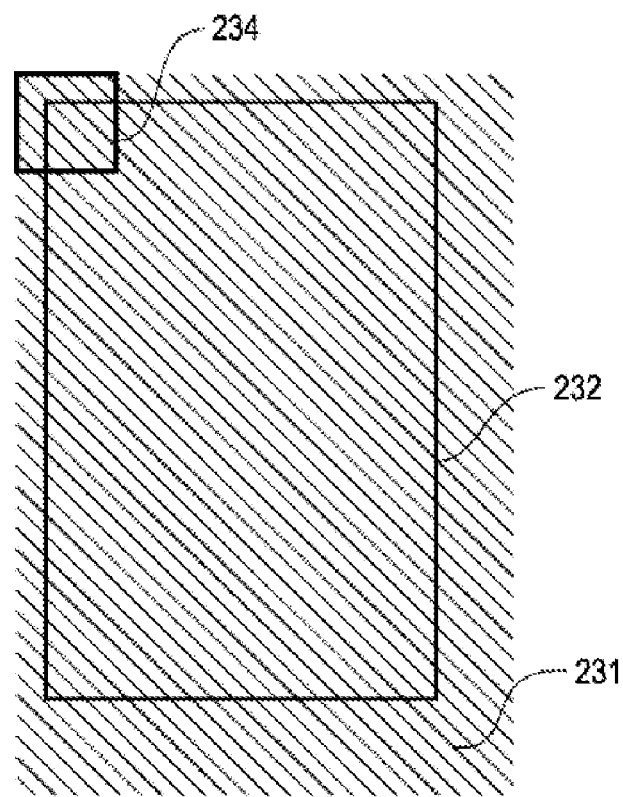
FIG. 6 shows an example where the borderless printing is performed for the printed matter attained by the known technology illustrated in FIG. 5.

Thus, even though no reference mark indicating the area where the additional information is embedded, the reference mark being indicated by a code 233 shown in FIG. 3, is not found in an image where additional information is embedded in each of blocks obtained by dividing the image data, it becomes possible to detect the position of the block where the additional information is embedded with high precision and extract the additional information.

Further, even though the area where the additional information is embedded is not determined according to the image size, the position of the block where the additional information is embedded can be detected. Therefore, the size of an image for printing may be made larger than that of a print medium so that when the image is printed, the border of the image is cut off, as in the case where the borderless printing is performed. In that case, if the additional information is embedded in part of the image, the part corresponding to the size of the print medium, it becomes possible to detect the position of the block where the additional information is embedded with high precision and extract the additional information.

Second Embodiment

Hereinafter, image processing according to a second embodiment of the present invention will be described. In the second embodiment, parts approximately equivalent to those described in the first embodiment are designated by the same reference numerals and the illustration thereof is omitted.

[General Description]

The additional-information-multiplexing unit 14 of the first embodiment divides a predetermined area of the input image information D1 into two or more N×N-pixel blocks, and changes the quantization-threshold value of each of the blocks, where the quantization-threshold value is calculated by the error-diffusion method, according to the bit number of the additional information. Then, the code pattern of the block is generated by combining sub-blocks, and the code pattern of each of the sub-blocks is made, so as to be rotationally symmetrical. The above-described code patterns are used in combination so that when one of the code patterns is vertically reversed, the reversed pattern becomes the same as one of the code patterns that are not vertically reversed. However, if the code pattern of each of the blocks is generated only by combining the sub-blocks with one another, it is often difficult to detect the position of the block where the additional information is embedded.

Figure 34:
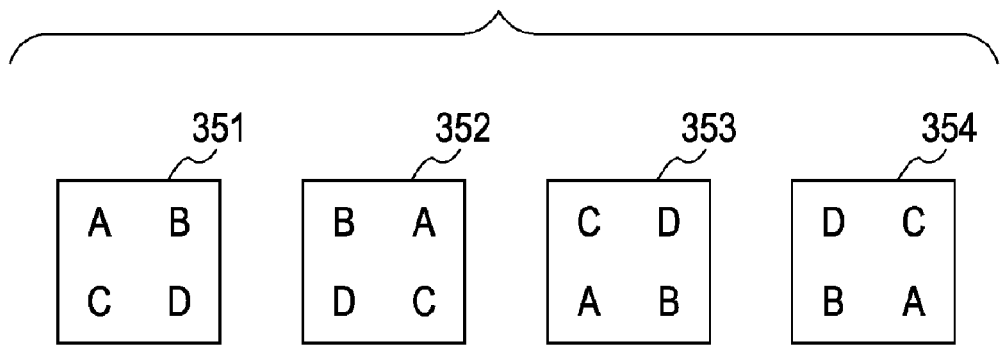
FIG. 34 shows four-code patterns generating a block where the additional information is embedded.
Figure 35:
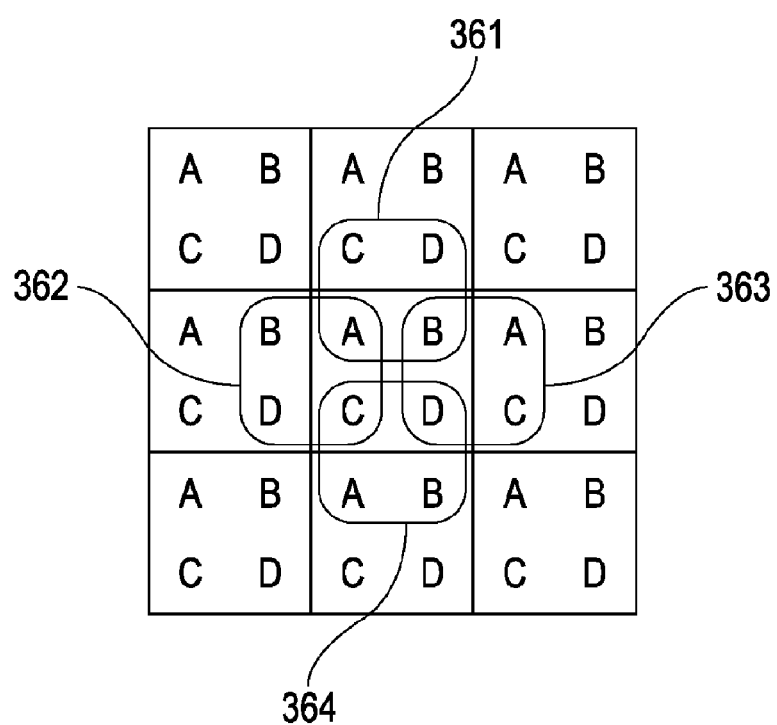
FIG. 35 shows the state where code patterns are sequentially embedded.

FIG. 34 shows four-code patterns generating a block where the additional information is embedded. Each of the code patterns 351, 352, 353, and 354 is generated, as a combination of four sub-blocks, and the patterns of the sub-blocks are determined to be A, B, C, and D. FIG. 35 shows the state where the code patterns 351 are sequentially embedded.

The block-position-detection unit 62 analyzes the frequency of the texture of the block, performs the additional-information-separation processing, so as to separate the additional information from the image information, and calculates the frequency-characteristic value obtained, as the frequency-analysis result and the code-determination value used to separate the additional information. Then, the feature extraction is performed on the basis of the frequency-characteristic value and the code-determination value, and the block position is detected. At that time, the block position can be detected on the basis of the fact that the frequency-characteristic value and the code-determination value that are obtained when the position of the processing block agrees with that of the block where the additional information is embedded are different from those obtained when the position of the processing block is shifted from that of the block where the additional information is embedded.

However, when the block-position-detection unit 62 detects the block position in each of the detection areas 361 and 364 shown in FIG. 35, the block-position-detection unit 62 erroneously determines each of the detected block positions to be the position of the block where the additional information is embedded, since the code pattern of each of the detection areas 361 and 364 agrees with the code pattern 353 shown in FIG. 34. Likewise, when the block position is detected in each of the detection areas 362 and 363 shown in FIG. 35, the block-position-detection unit 62 erroneously determines each of the detected block positions to be the position of the block where the additional information is embedded, since the code pattern of each of the detection areas 362 and 363 agrees with the code pattern 352 shown in FIG. 34. As a result, the block-position-detection unit 62 erroneously determines that the block where the additional information is embedded exists at a position shifted from the position of the block where the additional information is embedded by as much as a single sub-block. In that case, it is difficult for the block-position-detection unit 62 to correctly detect the position of the block where the additional information is embedded.

Figure 36:
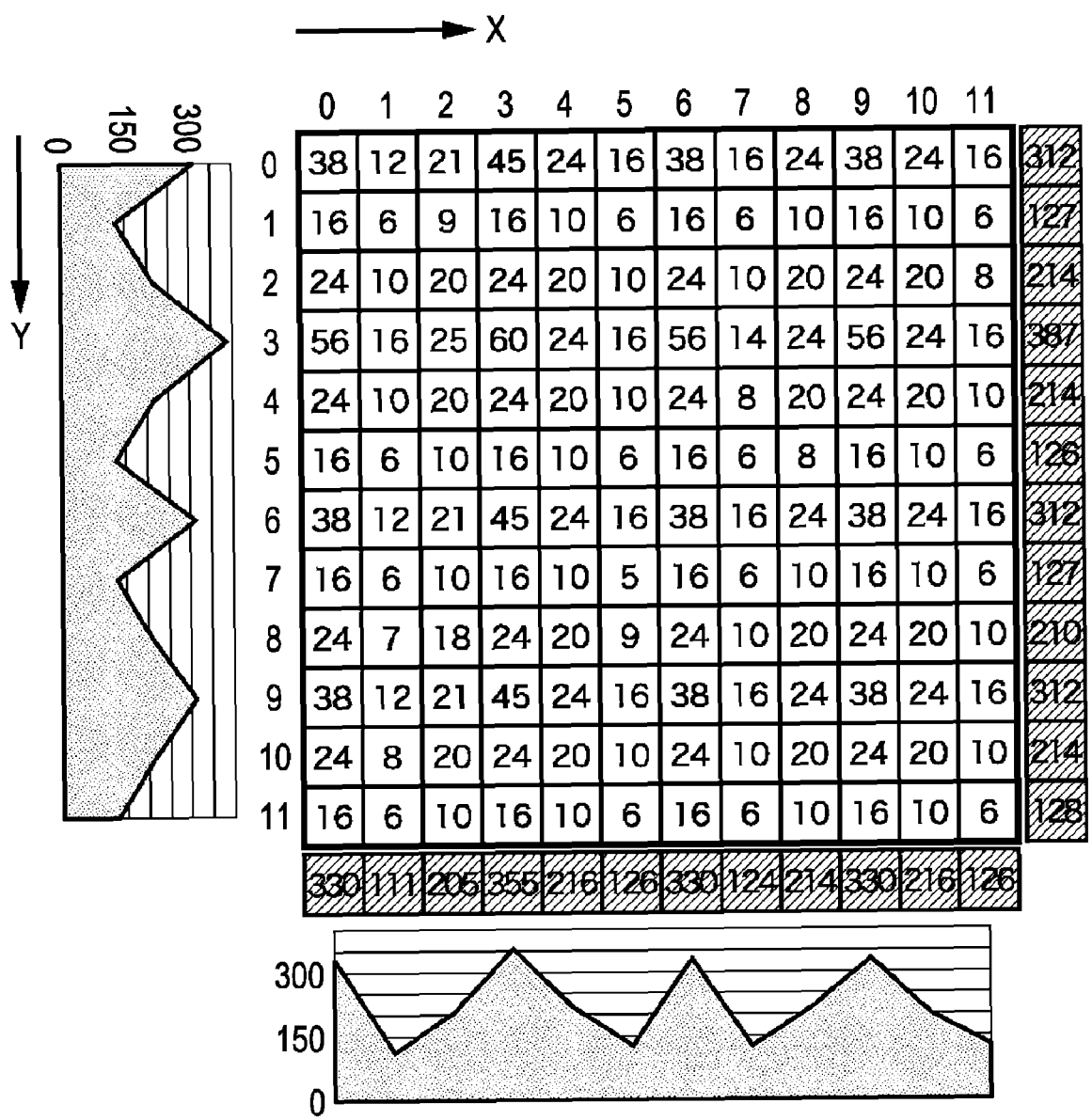
FIG. 36 shows code-determination amounts calculated by shifting the processing block by as much as a single pixel at a time when it is determined that a block where the additional information is embedded exists at a position shifted by as much as a single sub-block, and the value obtained by adding the code-determination amounts to one another.

FIG. 36 shows the code-determination amounts calculated by shifting the processing block by as much as a single pixel at a time when it is determined that the block where the additional information is embedded exists at a position shifted by as much as a single sub-block, and the value obtained by adding the code-determination amounts to one another.

If the size of the block where the additional information is embedded is determined to be 6×6 pixels, and the size of the sub-block of the block is determined to be 3×3 pixels, and if the position of the block where the additional information is embedded can be correctly detected, the peak appears for every six pixels at the position corresponding to each of the value obtained by the addition performed in the X direction and the value obtained by the addition performed in the Y direction. Therefore, if the above-described block position is detected, a maximum value is found for every six pixels arranged in the horizontal-axis direction, and another maximum value is found for every six pixels arranged in the vertical-axis direction. In an example shown in FIG. 36, however, the peaks of the addition values appear at intervals of three pixels.

It is difficult to correctly detect the position of the block where the additional information is embedded on the basis of the code-determination values shown in FIG. 36. The second embodiment of the present invention is provided to solve the above-described problems.

[Method of Combining Patterns of Sub-blocks]

Hereinafter, a method of combining the patterns of the sub-blocks with one another, so as to set the code pattern, will be described. The above-described method is used to solve the above-described problems and correctly detect the position of the block where the additional information is embedded.

Figure 37:
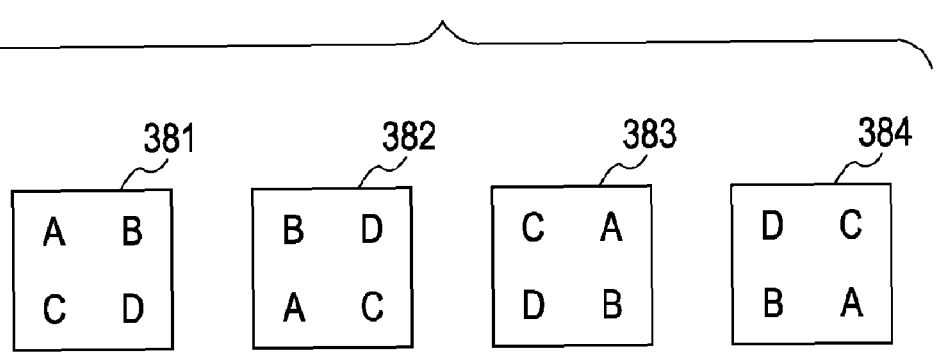
FIG. 37 shows four-code patterns generating a block where the additional information is embedded.
Figure 38:
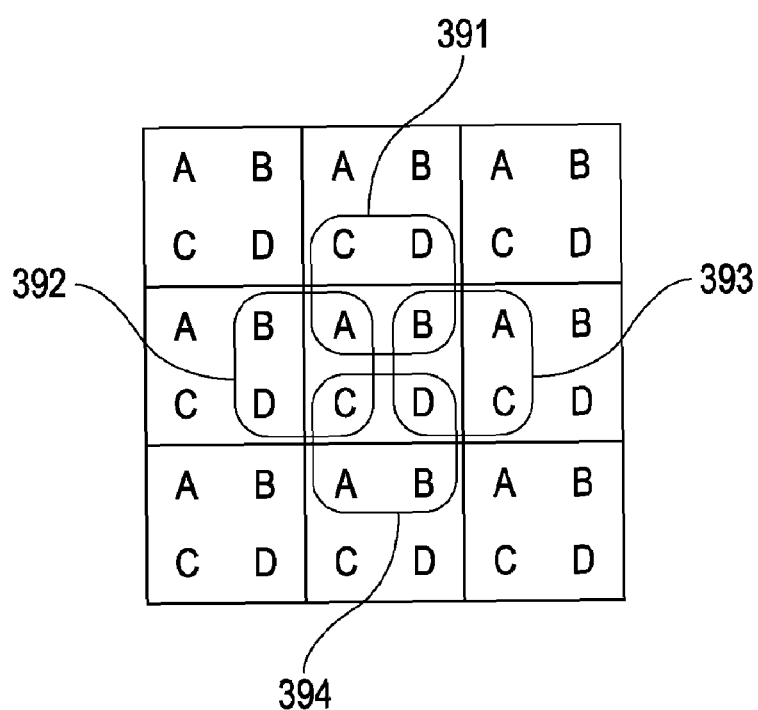
FIG. 38 shows the state where the code patterns are sequentially embedded.

FIG. 37 shows four-code patterns generating the block where the additional information is embedded. Each of code patterns 381, 382, 383, and 384 is generated, as a combination of four sub-blocks, and the patterns of the sub-blocks are determined to be A, B, C, and D. FIG. 38 shows the state where the code patterns 381 are sequentially embedded.

When the block-position-detection unit 62 detects the block position in each of the detection areas 391 and 394 that are shown in FIG. 38, the block-position-detection unit 62 can determine that each of the detected block positions is not the position of the block where the additional information is embedded, since the code pattern of each of the detection areas 391 and 394 does not agree with any of the code patterns shown in FIG. 37. Likewise, when the block position is detected in each of the detection areas 392 and 393 shown in FIG. 38, the block-position-detection unit 62 can determine that each of the detected block positions is not the position of the block where the additional information is embedded, since the code pattern of each of the detection areas 392 and 393 does not agree with any of the code patterns shown in FIG. 37. Thus, the patterns of the sub-blocks should be combined so that, at a position shifted by as much as a single sub-block, it can be determined that the above-described position is not the position of the block where the additional information is embedded, irrespective of in what combination the code patterns of the blocks are adjacent to one another. The above-described combination of the patterns of the sub-blocks should be set, as the code pattern.

According to the code patterns 381 to 384 shown in FIG. 37, the four patterns A, B, C, and D of different sub-blocks are combined with one another so that a single code pattern is generated. Even though each of the code patterns 381 to 384 is vertically reversed, the vertically-reversed code pattern becomes one of the code patterns 381 to 384. Further, according to the code patterns 381 to 384, at a position shifted by as much as a single sub-block, it can be determined that the position is not the position of the block where the additional information is embedded irrespective of in what combination the code patterns of the blocks are adjacent to one another.

The number of the combinations of the patterns of the sub-blocks is changed according to the number of the code patterns and/or the number of the sub-blocks. Therefore, the above-described combination number is not limited to that obtained by the code patterns 381 to 384 shown in FIG. 37. That is to say, the patterns of the sub-block should be combined so that even though the code pattern is vertically reversed, the vertically-reversed code pattern becomes one of the set code-patterns, and, at a position shifted by as much as a single sub-block, it can be determined that the above-described position is not the position of the block where the additional information is embedded, irrespective of in what combination the code patterns of the blocks are adjacent to one another. The above-described combination of the patterns of the sub-blocks should be set, as the code pattern of the block.

By setting the combination of the patterns of the sub-blocks in an appropriate manner, as described above, where the pattern combination generates the code pattern of the additional-information-multiplexing unit 14, it becomes possible to correctly detect the position of a block where the additional information is embedded.

Other Embodiment

Further, the present invention may be used for a system including a plurality of devices (e.g., a computer, an interface, a reader, a printer, etc.), and/or an apparatus provided, as a single device (e.g., a copier, a facsimile machine, a control unit, etc.).

It is to be understood that the object of the present invention can also be achieved by supplying a storage medium storing a computer program implementing the functions of the above-described embodiments to a system and/or an apparatus so that a computer (a CPU and/or an MPU) of the system and/or the apparatus executes the computer program. In that case, software itself read from the storage medium achieves the functions of the above-described embodiments, and the computer program and the storage medium storing the computer program constitute the present invention.

Further, not only by the computer executing the computer program, but also by an operating system (OS) or the like, the OS or the like running on the computer, executing part of or the entire actual processing based on instructions of the computer program, the functions of the above-described embodiments may be achieved.

Further, the computer program may be written into a memory of a function-expansion card and/or a function-expansion unit connected to the computer. That is to say, a CPU or the like of the function-expansion card and/or a function-expansion unit may execute part of or the entire actual processing on the basis of instructions of the computer program so that the above-described functions are achieved.

When utilizing the present invention for the storage medium, the computer program corresponding to and/or relating to the above-described flowcharts may be stored in the storage medium.

Thus, the position of additional information embedded in image information shown on a printer matter can be detected with precision. Therefore, the position of additional information embedded in image data shown on a printed matter obtained through borderless printing can be detected with precision, for example.

Further, the position of additional information embedded in image information shown on a printer matter can be detected with precision without being affected by the orientation of the printed matter. Therefore, a user can make the system and/or the apparatus read image data without concern for the orientation of the printed matter, so as to extract the additional information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-050197 filed on Feb. 28, 2007, which is hereby incorporated by reference herein in its entirety.

What is claimed is:

1. A code pattern embedding apparatus comprising:
a processor; and
a memory operatively coupled to the processor and stores instructions that, when executed by the processor, causes the processor to perform operations comprising:
inputting image information; and
embedding a plurality of code patterns in the image information according to additional information,
wherein the additional information includes direction-determination information used to detect a direction in which the additional information is embedded in the image information,
wherein when one of the code patterns is rotated, the rotated code pattern corresponds to one of the code patterns that are not yet rotated, and
wherein the code pattern is generated, as a combination of patterns of sub-blocks obtained by dividing two or more pixels forming the code pattern.

2. The apparatus according to claim 1, wherein the memory further stores instructions that, when executed by the processor, causes the processor to perform pseudo-halftoning for the image information, wherein the operations embeds the code patterns in the image information by controlling a quantization-threshold value of the halftoning unit according to the additional information.

3. The apparatus according to claim 1, wherein the additional information includes the direction-determination information used to detect the direction in which the additional information is embedded in the image information.

4. The apparatus according to claim 1, wherein the patterns of the sub-blocks are combined so that when the patterns of the sub-blocks are adjacent to one another, a first part of the adjacent patterns and a second part of the adjacent patterns do not generate the code pattern.

5. A method comprising:
inputting image information; and
embedding a plurality of code patterns in the image information according to additional information,
wherein the additional information includes direction-determination information used to detect a direction in which the additional information is embedded in the image information,
wherein when one of the code patterns is rotated, the rotated code pattern corresponds to one of the code patterns that are not yet rotated, and
wherein the code pattern is generated, as a combination of patterns of sub-blocks obtained by dividing two or more pixels forming the code pattern.

6. The method according to claim 5, further comprising the step of performing pseudo-halftoning for the image information,
wherein, at the embedding step, the code patterns are embedded in the image information by controlling a quantization-threshold value obtained at the halftoning step according to the additional information.

7. The method according to claim 5, wherein the additional information includes the direction-determination information used to detect the direction in which the additional information is embedded in the image information.

8. The method according to claim 5, wherein the patterns of the sub-blocks are combined so that when the patterns of the sub-blocks are adjacent to one another, a first part of the adjacent patterns and a second part of the adjacent patterns do not generate the code pattern.

9. A computer-readable non-transitory storage medium storing instructions which, when executed by an apparatus, causes the apparatus to perform operations comprising:
inputting image information; and
embedding a plurality of code patterns in the image information according to additional information,
wherein the additional information includes direction-determination information used to detect a direction in which the additional information is embedded in the image information,
wherein when one of the code patterns is rotated, the rotated code pattern corresponds to one of the code patterns that are not yet rotated, and
wherein the code pattern is generated, as a combination of patterns of sub-blocks obtained by dividing two or more pixels forming the code pattern.

* * * * *